United States Patent
Liu et al.

(10) Patent No.: US 11,423,304 B2
(45) Date of Patent: Aug. 23, 2022

(54) SYSTEM AND METHOD FOR SEMANTIC ANALYSIS OF MULTIMEDIA DATA USING ATTENTION-BASED FUSION NETWORK

(71) Applicants: Beijing Jingdong Shangke Information Technology Co., Ltd., Beijing (CN); JD.com American Technologies Corporation, Mountain View, CA (US)

(72) Inventors: Shizhu Liu, Mountain View, CA (US); Yang Tao, Seattle, WA (US); Shanglin Yang, Sunnyvale, CA (US); Li Chen, Mountain View, CA (US); Hui Zhou, Sunnyvale, CA (US)

(73) Assignees: BEIJING JINGDONG SHANGKE INFORMATION TECHNOLOGY CO., LTD., Beijing (CN); JD.COM AMERICAN TECHNOLOGIES CORPORATION, Mountain View, CA (US)

( * ) Notice: Subject to any disclaimer, the term of this patent is extended or adjusted under 35 U.S.C. 154(b) by 450 days.

(21) Appl. No.: 16/744,157

(22) Filed: Jan. 15, 2020

(65) Prior Publication Data
US 2021/0216862 A1 Jul. 15, 2021

(51) Int. Cl.
*G06N 3/08* (2006.01)
*G06K 9/62* (2022.01)
*G06N 3/04* (2006.01)

(52) U.S. Cl.
CPC ............. *G06N 3/08* (2013.01); *G06K 9/6289* (2013.01); *G06N 3/0454* (2013.01)

(58) Field of Classification Search
CPC ...... G06N 3/08; G06N 3/0454; G06N 3/0445; G06K 9/6289; G06K 9/6271; G06V 10/50; G06V 10/82
See application file for complete search history.

(56) References Cited

U.S. PATENT DOCUMENTS 10,909,604 B1 * 2/2021 Zappella ............ G06Q 30/0623
10,990,645 B1 * 4/2021 Shi ......................... G06N 3/08
(Continued)

OTHER PUBLICATIONS

Caiming Xiong, Stephen Merity, Richard Socher. Dynamic memory networks for visual and textual question answering, Proceedings of the 33rd International Conference on Machine Learning, 2016.

(Continued)

*Primary Examiner* — Marcos L Torres
(74) *Attorney, Agent, or Firm* — Scully, Scott, Murphy & Presser

(57) ABSTRACT

A system and a method for multimedia data analysis. The system includes a computing device. The computer device includes a processor and a storage device storing computer executable code. The computer executable code, when executed at the processor, is configured to: encode task description and task meta info into concatenated task vectors; encode context text and context meta info into concatenated context text vectors; encode context image and the context meta info into concatenated context image vectors; perform dual coattention on the concatenated task vectors and the concatenated context text and image vectors to obtain attended task vectors and attended context vectors; perform BiLSTM on the attended task vectors and the attended context vectors to obtain task encoding and context encoding; and decode the task encoding and the context encoding to obtain an answer to the task.

20 Claims, 9 Drawing Sheets

(56) References Cited

U.S. PATENT DOCUMENTS

2020/0250538 A1* 8/2020 Li ..................... G06F 16/2425
2020/0380298 A1* 12/2020 Aggarwal ............ G06K 9/6272

OTHER PUBLICATIONS

Caiming Xiong, Victor Zhong, Richard Socher, Dynamic coattention networks for question answering, ICLR, 2017.
Richard Socher, Andrej Karpathy, Quoc V Le, Christopher D. Manning, Andrew Y. Ng, Grounded compositional semantics for finding and describing images with sentences, Association for Computing Linguistics (ACL), 2014.
Hyeonseob Nam, Jung-Woo Ha, Jeonghee Kim, Dual attention networks for multimodal reasoning and matching, arXiv:1611.00471, 2016.
Dongfei Yu, Jianlong Fu, Tao Mei, Yong Rui, Multi-level attention networks for visual question answering, CVPR, 2017.
Alex Krizhevsky, Ilya Sutskever, Geoffrey E. Hinton, ImageNet classification with deep convolutional neural networks, NIPS, 2012.
Antonio Rubio, Longlong Yu, Edgar Simo-Serra, Francesc Moreno-Noguer, Multi-modal embedding for main product detection in fashion, The IEEE International Conference on Computer Vision (ICCV), 2017, pp. 2236-2242.

* cited by examiner

SYSTEM AND METHOD FOR SEMANTIC ANALYSIS OF MULTIMEDIA DATA USING ATTENTION-BASED FUSION NETWORK

CROSS-REFERENCES

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates generally to target object attribute extraction and inference, and more specifically related to an end-to-end neural network with attention-based fusion mechanism to obtain information from multimedia data.

BACKGROUND OF THE DISCLOSURE

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A large amount of target objects on the internet are represented by multimedia data. For example, on social network applications, high percentage of posts include both texts and images; and on an online retail platform, a product can also be described by images and texts. For a text question on the target post or the target product, a variety of semantic analyses are available to predict the attribute of the target object based on these texts and images. Some methods answer a text question by focusing on the target text, some methods answers the text question by focusing on the target images. However, none of the methods use both the text information and image information efficiently.

Therefore, an unaddressed need exists in the art to address the aforementioned deficiencies and inadequacies.

SUMMARY OF THE DISCLOSURE

In certain aspects, the present disclosure relates to a system for multimedia data analysis. In certain embodiments, the system includes a computing device. The computing device has a processor and a storage device storing computer executable code. The computer executable code, when executed at the processor, is configured to:

receive a task comprising task description and task meta info, where the task description is in text format, and the task meta info includes source, type and index of the task;

provide multimedia context related to the task, where the multimedia context includes context text, context image, and context meta info comprising source, type and index of the context;

embed sequential words of the task description into task description embeddings, perform a first neural network on the task description embeddings to obtain task feature vectors, encode the task meta info into task embedding vectors, and concatenate the task feature vectors and the task embedding vectors into concatenated task vectors;

when the context includes the context text, embed sequential words of the context text into context text embeddings, perform a second neural network on the context text embeddings to obtain context feature vectors, encode the context meta info into context embedding vectors, and concatenate the context feature vectors and the context embedding vectors into concatenated context vectors;

when the context includes the context image, perform a third neural network on the context image to obtain context image embeddings, perform a fourth neural network on the context image embeddings to obtain the context feature vectors, encode the context meta info into the context embedding vectors, and concatenate the context feature vectors and the context embedding vectors into the concatenated context vectors;

perform dual coattention on the task feature vectors, the concatenated task vectors, the context feature vectors and the concatenated context vectors, to obtain attended task vectors and attended context vectors;

perform a fifth neural network on the attended task vectors and the attended context vectors to obtain task encoding and context encoding; and decode the task encoding and the context encoding to obtain an answer to the task.

In certain embodiments, the computer executable code is configured to encode the task meta info into task embedding vectors by: converting the task meta info into task one-hot vectors; and multiplying the task one-hot vectors and task matrices to form the task embedding vectors, where the task matrices includes a source matrix representing sources of the task, a type matrix representing type of the task, and an index matrix representing indices of the task.

In certain embodiments, the computer executable code is configured to encode the context meta info into context embedding vectors by converting the context meta info into context one-hot vectors; and multiplying the context one-hot vectors and the task matrices to form the context embedding vectors.

In certain embodiments, each of the first, the second, the fourth and the fifth neural networks is a bi-directional long-short term memory network (BiLSTM), and the third neural network is a convolutional neural network (CNN).

In certain embodiments, the computer executable code is configured to perform CNN on the context image to obtain context image embeddings by dividing the context image into a plurality of regions; performing CNN on each of the regions; and taking hidden layers of the CNN as the context image embeddings. In certain embodiments, the context image is divided into 4-6400 regions. In certain embodiments, a number of the regions in the context image is learned by the CNN.

In certain embodiments, the computer executable code is configured to decode the task encoding and the context encoding to obtain the answer to the task by:

embedding words of a part of the answer at previous time steps to obtain embedded partial answer;

applying one directional LSTM on the embedded partial answer to obtain intermediate decoder state;

combining the intermediate decoder state with the task encoding to obtain distribution of task word vectors in the task encoding;

combining the intermediate decoder state with the context encoding to obtain distribution of context word vectors in the context encoding;

combining the intermediate decoder state with the context encoding and context attention to obtain a combination, and apply a fully connected layer on the combination to obtain vocabulary distribution;

generating an output distribution based on distribution of the task word vectors, the distribution of the context word vectors, and the vocabulary distribution; and selecting a next word for the part of the answer from the output distribution.

In certain embodiments, the fully connected layer is a feed forward network (FFN).

In certain embodiments, the step of generating the output distribution is performed by: learning a vocabulary pointer switch regulating a probability that the answer is generated from external vocabulary versus the context or the task; learning a context-task switch regulating a probability that the answer is generated from the context versus the task description; and averaging the distribution of the task word vectors, the distribution of the context word vectors, and the vocabulary distribution using the vocabulary pointer switch and the context-task switch as weights, so as to obtain the output distribution.

In certain embodiments, model in the computer executable code is trained using a token-level negative log-likelihood loss over all time-steps: $L=-\Sigma_t^T \log p(\alpha_t)$.

In certain aspects, the present disclosure relates to a method for multimedia data analysis. In certain embodiments, the method includes:

receiving, by a computing device, a task comprising task description and task meta info, where the task description is in text format, and the task meta info includes source, type and index of the task;

providing, by the computing device, multimedia context related to the task, where the multimedia context includes context text, context image, and context meta info comprising source, type and index of the context;

embedding, by the computing device, sequential words of the task description into task description embeddings, performing a first neural network on the task description embeddings to obtain task feature vectors, encoding the task meta info into task embedding vectors, and concatenating the task feature vectors and the task embedding vectors into concatenated task vectors;

when the context includes the context text, embedding, by the computing device, sequential words of the context text into context text embeddings, performing a second neural network on the context text embeddings to obtain context feature vectors, encoding the context meta info into context embedding vectors, and concatenating the context feature vectors and the context embedding vectors into concatenated context vectors;

when the context includes the context image, performing, by the computing device, a third neural network on the context image to obtain context image embeddings, performing a fourth neural network on the context image embeddings to obtain the context feature vectors, encoding the context meta info into the context embedding vectors, and concatenating the context feature vectors and the context embedding vectors into the concatenated context vectors;

performing, by the computing device, dual coattention on the task feature vectors, the concatenated task vectors, the context feature vectors and the concatenated context vectors, to obtain attended task vectors and attended context vectors;

performing, by the computing device, a fifth neural network on the attended task vectors and the attended context vectors to obtain task encoding and context encoding; and decoding, by the computing device, the task encoding and the context encoding to obtain an answer to the task.

In certain embodiments, the step of encoding the task meta info into task embedding vectors includes: converting the task meta info into task one-hot vectors; and multiplying the task one-hot vectors and task matrices to form the task embedding vectors, where the task matrices includes a source matrix representing sources of the task, a type matrix representing type of the task, and an index matrix representing indices of the task.

In certain embodiments, the step of encoding the context meta info into context embedding vectors includes converting the context meta info into context one-hot vectors; and multiplying the context one-hot vectors and the task matrices to form the context embedding vectors.

In certain embodiments, each of the first, the second, the fourth and the fifth neural networks is a bi-directional long-short term memory network (BiLSTM), and the third neural network is a convolutional neural network (CNN).

In certain embodiments, the step of performing CNN on the context image to obtain context image embeddings includes dividing the context image into a plurality of regions; performing CNN on each of the regions; and taking hidden layers of the CNN as the context image embeddings.

In certain embodiments, the computer executable code is configured to decode the task encoding and the context encoding to obtain the answer to the task by:

embedding words of a part of the answer at previous time steps to obtain embedded partial answer;

applying one directional LSTM on the embedded partial answer to obtain intermediate decoder state;

combining the intermediate decoder state with the task encoding to obtain distribution of task word vectors in the task encoding;

combining the intermediate decoder state with the context encoding to obtain distribution of context word vectors in the context encoding;

combining the intermediate decoder state with the context encoding and context attention to obtain a combination, and apply a fully connected layer on the combination to obtain vocabulary distribution;

generating an output distribution based on distribution of the task word vectors, the distribution of the context word vectors, and the vocabulary distribution; and selecting a next word for the part of the answer from the output distribution.

In certain embodiments, the fully connected layer is a feed forward network (FFN).

In certain embodiments, the step of generating the output distribution is performed by:

learning a vocabulary pointer switch regulating a probability that the answer is generated from external vocabulary versus the context or the task;

learning a context-task switch regulating a probability that the answer is generated from the context versus the task description; and averaging the distribution of the task word vectors, the distribution of the context word vectors, and the vocabulary distribution using the vocabulary pointer switch and the context-task switch as weights, so as to obtain the output distribution.

In certain aspects, the present disclosure relates to a non-transitory computer readable medium storing computer executable code. The computer executable code, when executed at a processor of a computing device, is configured to perform the method described above.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

DETAILED DESCRIPTION

Figure 1:
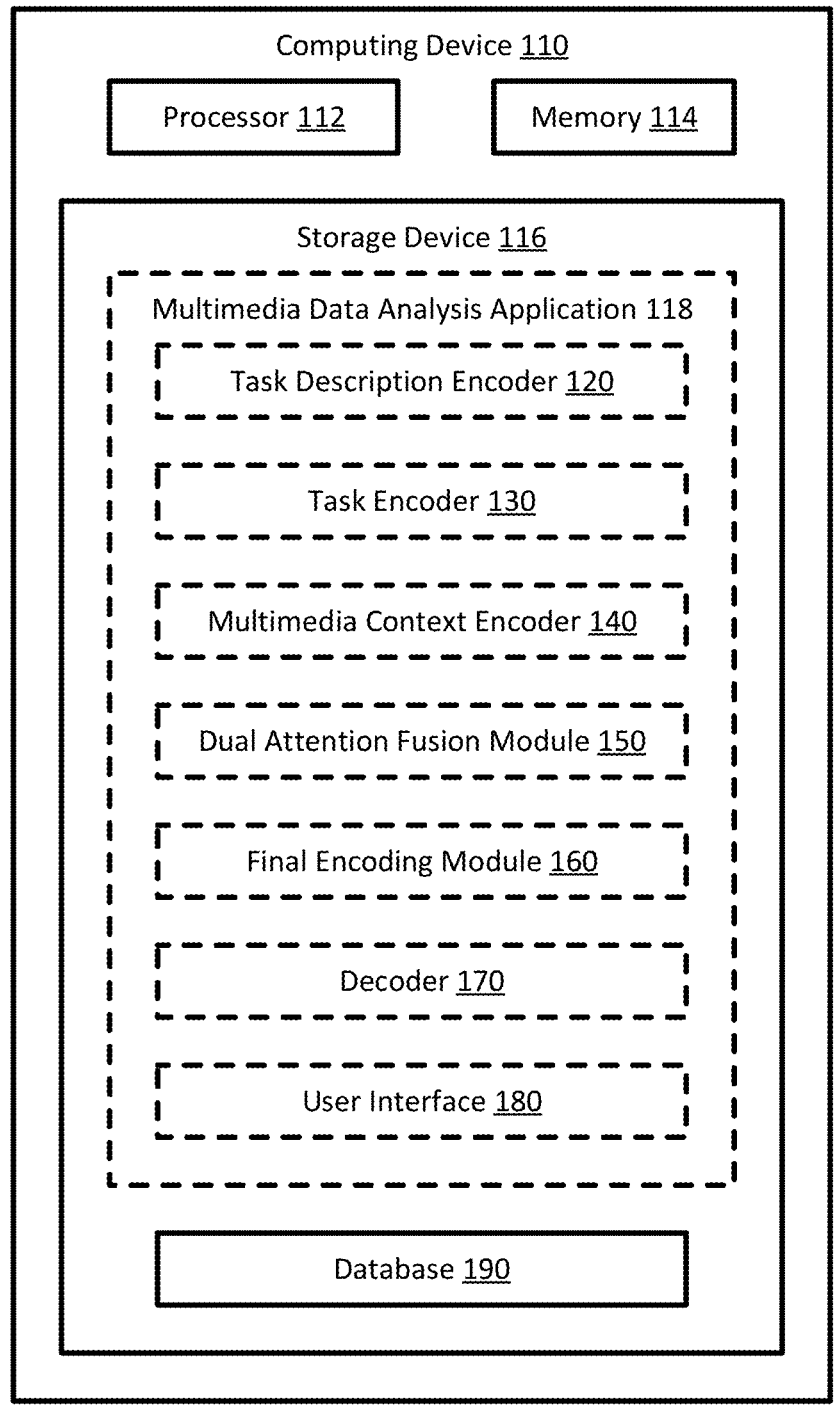
FIG. 1 schematically depicts a computing system for multimedia data semantic analysis using an attention-based fusion network according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompass both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about", "substantially" or "approximately" shall generally mean within 20 percent, preferably within 10 percent, and more preferably within 5 percent of a given value or range. Numerical quantities given herein are approximate, meaning that the term "around", "about", "substantially" or "approximately" can be inferred if not expressly stated.

As used herein, "plurality" means two or more.

As used herein, the terms "comprising", "including", "carrying", "having", "containing", "involving", and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

In certain aspects, the present disclosure aims to infer or extract attributes of target object represented by multimedia data that are wildly exist on the internet.

In certain embodiments, the present disclosure provides a method for answering a natural language or text question by extracting relevant information from textual reference documents of a target object. The method uses an end-to-end neural networks to first encode the question and the reference documents by semantic meanings and then predict the answer from the reference documents. However, the method only uses the text information of the target object, and misses the relevant information in the images.

In certain embodiments, the present disclosure provides a method for answering a text question by extracting relevant information from corresponding visual images of a target object. The method uses convolutional neural networks (CNN) to first learn high level semantics to generate question-related concepts as semantic attention, and then encode region-based mid-level outputs from CNN into spatially-embedded representation by recurrent neural network (RNN), and further pinpoint the answer-related regions by multi-layer perceptron as visual attention. However, the method only uses the image information of the target object.

In certain embodiments, the present disclosure may ensemble the above described image based method and the text based method. But the ensembled system still loses accuracy, due to the lack of compositional representation from heterogeneous data.

In certain embodiments, the present disclosure provides a method for multimodal reasoning and matching to capture interplay between vision and language to constitute unified representation from textual and visual data. The method employs an attention mechanism to specific regions in images and words in text through multiple steps and gather essential information from both modalities. Specifically, these network collaboratively performs visual and textual attentions using a joint memory which assembles the previous attention results and guides the next attentions. Although the method captures interplay between vision and language, it fails to distinguish between the requirement from questions, and the information from reference documents.

In certain aspects, to improve question-answer efficiency and accuracy, the present disclosure provides a method utilizing inference from the question and from both the text and image of the target object context. Specifically, the disclosure solves the problem based on an end-to-end neural network, coupled with attention-based fusion mechanism. For a given task, the input data include a task description textual data Q, and a target multimedia context data set C. Each input data entry can be described with a tuple (s, t, i, c), where s is a two dimensional one-hot vector to indicate if the data is task description or context data, t is a two dimensional one-hot vector to indicate if the type of the data is text or image, i is a two dimensional one-hot vector to represent the index of the input data entry which is an identification of the task or context, and c represents the content of the given data.

In certain embodiments, the attention-based fusion network includes the following four main components:

1) A set of neural networks to encode different types of data and generate representation for each input data.

In the query-answer problem according to certain embodiments of the present disclosure, the input data include task description and target multimedia data. The task description is in text format, and the target multimedia data includes both text and one or more images.

For textual data, the disclosure employs long short-term memories (LSTMs) to generate representation for the text. Given one-hot encoding of T input words $\{w_1, w_2, \ldots, w_i, \ldots, w_T\}$, with a word embedding layer, the disclosure can convert the source text S into a sequence of word embedding: $E=\{e_1, e_2, \ldots, e_i, e_T\}$. Here $e_i$ is a vector standing for a d dimensional word embedding for the i-th word in the text document. To get the word embedding representation E, the disclosure first looks up the embedding matrix $W^{wrd} \in \mathbb{R}^{d^{emb}|V|}$ where V is a fixed-sized vocabulary, and $d^{emb}$ is the size of word embedding. The matrix $W^{wrd}$ is the parameters to be learned with model of the disclosure, and the $d^{emb}$ is a hyper-parameter for the model to be chosen by a user. The disclosure transforms a word $w_i$ into its word embedding $e_i$ by using matrix-vector product: $e_i = W^{wrd}v_i$ where $v_i$ is a vector of word $w_i$ index in V. Then the disclosure feeds the vectors into bidirectional LSTMs (BiLSTMs): $h_t^{(f)} = \text{LSTM}^{(f)}(x_t, h_{t-1}^{(f)})$, $h_t^{(b)} = \text{LSTM}^{(b)}(x_t, h_{t-1}^{(b)})$, where $h_t^{(f)}$ and $h_t^{(b)}$ represent the hidden states at time t from the forwards and backward LSTMs, respectively, where $x_t$ is the t-th token. By concatenating the two hidden states at each time step, the disclosure constructs a set of feature vectors $\{u_1, u_2, \ldots, u_T\}$ where $u_i$ encodes the semantics of the i-th word in the given reference document.

For the image data, the disclosure utilizes a convolutional neural network (CNN) based model and extract visual feature from hidden layers. The module splits an image into small local regions, and considers each region as equivalent to a word in the input module for text data. For each region, the disclosure uses a CNN to extract features. In order to obtain feature vectors for different regions, the disclosure takes the last pooling layer. Thus, the input image is represented by $\{r_1, r_2, r_i, \ldots, r_N\}$, where N is the number of image regions and $r_i$ is a feature vector corresponding to the i-th region. Finally, the disclosure feeds the list of feature vectors to a BiLSTM to capture the interaction between these regions, and the hidden states of this BiLSTM $\{z_1, z_2, \ldots, z_i, \ldots, z_N\}$ are utilized to represent the semantics of the image.

2) A task encoding layer to encode the source and type of data.

The task encoding layer is comprised of three embedding layers ($M_s$, $M_t$, $M_i$) to encode the source, type and index information. The disclosure can transform a source one-hot vector $s_i$ into its embedding $es_i$ by using matrix-vector product: $es_i = M_s s_i$, one-hot vector $t_i$ into its embedding $et_i$ by using matrix-vector product: $et_i = M_t s_i$, one-hot vector $i_i$ into its embedding $ei_i$ by using matrix-vector product: $ei_i = M_i i_i$. By concatenate $es_i$, $et_i$, and $ei_i$, the disclosure can get the embedding of its task info $k_i$. Then, for each data entry, the disclosure concatenates the feature vectors constructed in the above step 1 with its task embedding in this step 2.

3) A fusion layer that captures the interactions between a task description and input target data, and construct unified representation for the task.

With first two component, for each analysis task, the disclosure can represent the task description Q as $\{Q_{proj}, Q_{enc}\}$, and the target context multimedia dataset C as $\{C_{proj}, C_{enc}\}$. Here $Q_{proj}$ is the word embedding representation of the task description, i.e., task feature vectors, $Q_{enc}$ is the concatenation of text encoder outputs and the task encoder output. $C_{proj}$ is the concatenation of all target context data entries' text embedding layers and image pooling layers. $C_{enc}$ is the concatenation of all target context data entries' BiLSTM encoder outputs and the task encoder output.

To get the fusion representation of task description and target context dataset, the disclosure first aligns encoded representations of Q and C by normalizing dot-product similarity scores between representations of one with those of other:

$$\text{softmax}(C_{enc}Q_{enc}^T) = S_{cq}$$

$$\text{softmax}(Q_{enc}C_{enc}^T) = S_{qc}$$

Then the weighted summations of the information from one sequence that is relevant to a single feature in the other: $S_{cq}^T C_{enc} = C_{sum}$, $S_{qc}^T Q_{enc} = Q_{sum}$.

The fusion representations use the same weights to transfer information gained from alignments back to the original sequences: $S_{cq}^T C_{sum} = C_{fus}$, $S_{qc}^T Q_{sum} = Q_{fus}$. In order to compress information from dual fusion representation back to the more manageable dimension d, the disclosure concatenates all four prior representations for each sequence along the last dimension and feed into separate BiLSTMs:

$$\text{BiLSTM}_{comC}([C_{proj}; C_{enc}; Q_{sum}; C_{fus}]) = C_{com} \in \mathbb{R}^{l \times d}$$

$$\text{BiLSTM}_{comQ}([Q_{proj}; Q_{enc}; C_{sum}; Q_{fus}]) = Q_{com} \in \mathbb{R}^{m \times d}$$

These matrices are given to the decoder to generate the predictions.

4) A decoder neural network that process the fusion information to make the predictions according to different tasks.

The model of the disclosure can generate tokens that are not in the context or task description, and the disclosure gives it access to v additional vocabulary tokens. The disclosure obtains distributions over tokens in the context multimedia data, task description and this external vocabulary, respectively, as:

$$\Sigma_{i:c_i=w_t}(\alpha_t^C)_i = p_c(w_t) \in \mathbb{R}^n,$$

$$\Sigma_{i:c_i=w_t}(\alpha_t^Q)_i = p_q(w_t) \in \mathbb{R}^m,$$

$$\text{softmax}(W_v \widetilde{c}_t) = p_v(w_t) \in \mathbb{R}^v.$$

These distributions are extended to cover the union of the tokens in the context, task description, and external vocabulary by setting missing entries in each to 0 so that each distribution is in $\mathbb{R}^{l+m+v}$. Two scalar switches regulate the importance of each distribution in determining the final output distribution.

$$\sigma(W_{pv}[\widetilde{c}_t; h_t; (A_{self})_{t-1}]) = \gamma \in [0, 1]$$

$$\sigma(W_{cq}[\widetilde{q}_t; h_t; (A_{self})_{t-1}]) = \lambda \in [0, 1]$$

$$\gamma p_v(w_t) + (1-\gamma)[\lambda p_c(w_t) + (1-\lambda)p_q(w_t)] = p(w_t) \in \mathbb{R}^{l+m+v}$$

In certain embodiments, the model is trained using a token-level negative log-likelihood loss over all time-steps: $L = -\Sigma_t^T \log p(\alpha_t)$. Kindly note $\lambda$ here corresponds to in FIG. 4B below.

As a result, the present disclosure conducts different kinds of semantic analysis tasks with one end-to-end neural network, which can digest different type of data and construct task oriented representation for the target object. Further, the relevant representation for different task can be effectively addressed by attention-based fusion mechanism.

FIG. 1 schematically depicts a computing system for multimedia data semantic analysis using an attention-based fusion network according to certain embodiments of the present disclosure. As shown in FIG. 1, the system 100 includes a computing device 110. In certain embodiments, the computing device 110 shown in FIG. 1 may be a server computer, a cluster, a cloud computer, a general-purpose computer, a headless computer, or a specialized computer, which provides multimedia data analysis. The computing device 110 may include, without being limited to, a processor 112, a memory 114, and a storage device 116, and optionally a database 190. In certain embodiments, the computing device 110 may include other hardware components and software components (not shown) to perform its corresponding tasks. Examples of these hardware and software components may include, but not limited to, other required memory, interfaces, buses, Input/Output (I/O) modules or devices, network interfaces, and peripheral devices.

The processor 112 may be a central processing unit (CPU) which is configured to control operation of the computing device 110. The processor 112 can execute an operating system (OS) or other applications of the computing device 110. In certain embodiments, the computing device 110 may have more than one CPU as the processor, such as two CPUs, four CPUs, eight CPUs, or any suitable number of CPUs.

The memory 114 can be a volatile memory, such as the random-access memory (RAM), for storing the data and information during the operation of the computing device 110. In certain embodiments, the memory 114 may be a volatile memory array. In certain embodiments, the computing device 110 may run on more than one memory 114.

The storage device 116 is a non-volatile data storage media for storing the OS (not shown) and other applications of the computing device 110. Examples of the storage device 116 may include non-volatile memory such as flash memory, memory cards, USB drives, hard drives, floppy disks, optical drives, or any other types of data storage devices. In certain embodiments, the computing device 110 may have multiple storage devices 116, which may be identical storage devices or different types of storage devices, and the applications of the computing device 110 may be stored in one or more of the storage devices 116 of the computing device 110. The storage device 116 includes, among other things, a multimedia data analysis application 118. The multimedia data analysis application 118 includes a task description encoder 120, a task encoder 130, a multimedia context encoder 140, a dual attention fusion module 150, a final encoding module 160, a decoder 170, and a user interface 180. In certain embodiments, the storage device 116 may include other applications or modules necessary for the operation of the multimedia data analysis application 118. It should be noted that the modules 120-180 are each implemented by computer executable codes or instructions, or data table or databases, which collectively forms one application. In certain embodiments, each of the modules may further include sub-modules. Alternatively, some of the modules may be combined as one stack. In other embodiments, certain modules may be implemented as a circuit instead of executable code.

In this embodiments, the processor 112, the memory 114, the storage device 116 are component of the computing device, such as a server computing device 110. In other embodiments, the computing device 110 may be a distributed computing device and the processor 112, the memory 114 and the storage device 116 are shared resources from multiple computers in a pre-defined area.

Figure 2A:
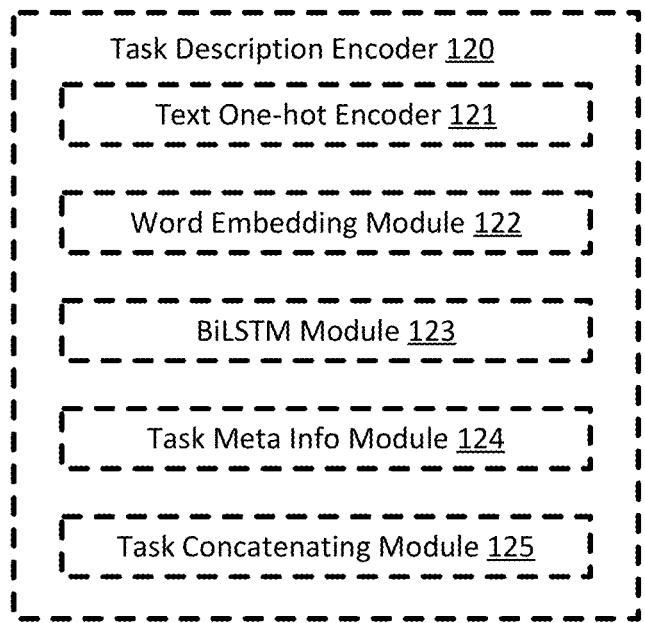
FIG. 2A schematically depicts a task description encoder according to certain embodiments of the disclosure.

The task description encoder 120 is configured to retrieve or receive description of a task, encode the task description to task feature vectors, encode the task meta info and task encoding matrix into task embedding vectors or matrix, concatenate the task feature vectors and the task embedding vectors of the task to concatenated task vectors, and send the concatenated task vectors to the dual attention fusion module 150. As shown in FIG. 2A, the task description encoder 120 includes a text one-hot encoder 121, a word embedding module 122, a BiLSTM module 123, a task meta info module 124, and a task concatenating module 125. In certain embodiments, the task is a textual question or query, and the task description is the text of the question or the query.

The text one-hot encoder 121 is configured to, upon receiving the text of the task description, convert each word in the textual task description into a one-hot vector, and send the one-hot vectors of the text to the word embedding module 122. In certain embodiments, the text one-hot encoder 121 processes the text by filtering out punctuations, changing the cases of the words into lowercases, splitting the words by spaces to obtain T number of words $\{w_1, w_2, \ldots, w_i, \ldots, w_T\}$, and converts the T number of words into their corresponding one-hot vectors $\{v_1, v_2, \ldots, v_i, \ldots, v_T\}$ using a fixed-sized vocabulary. The one-hot vector $v_i$ has a dimension of the fixed-size, the i-th dimension of the one-hot vector $v_i$ is set to be 1, and all the other dimensions of the one-hot vector $v_i$ are set to 0. Kindly note conversion of the text to the one-hot representations is performed in sequence. Thus, the sequential information of the text is maintained.

The word embedding module 122 is configured to, upon receiving the sequential one-hot vectors $\{v_1, v_2, \ldots, v_i, \ldots, v_T\}$ of the words in the task description, embed the one-hot vectors into embedding vectors $\{e_1, e_2, \ldots, e_i, \ldots, e_T\}$, and send the embedding vectors to the BiLSTM module 123. The dimension of the embedding vectors d can be defined by the disclosure or learned by the word embedding module 122, and the dimension d is much smaller than the dimension of the one-hot vectors. In certain embodiments, the word embedding module 122 is an embedding layer of the multimedia data analysis application 118, and the parameters of the embedding layer are learned during the training of the multimedia data analysis application 118. By word embedding, the dimension of the one-hot vectors of the words is reduced significantly to the dimension of the embedding vectors.

The BiLSTM module 123 is configured to, upon receiving the sequential embedding vectors $\{e_1, e_2, \ldots, e_i, \ldots, e_T\}$, feed the embedding vectors to the BiLSTM, perform BiLSTM on the embedding vectors to obtain task feature vectors $\{u_1, u_2, \ldots, u_i, \ldots, u_T\}$, and send the task feature vectors to the task concatenating module 125 and the dual attention fusion module 150. The feature vector $u_i$ encodes the semantics of the i-th word in the textual description of the task. In the BiLSTM, the hidden states at time t from the forward and backward LSTMs are respectively $h_t^{(f)} = LSTM^{(f)}(x_t, h_{t-1}^{(f)})$ and $h_t^{(b)} = LSTM^{(b)}(x_t, h_{t-1}^{(b)})$, and the feature vectors are obtained by concatenating the two hidden states at each time step.

The task meta info module 124 is configured to, upon retrieving or receiving the meta info of the task, obtain one-hot vectors $s_i$, $t_i$, $i_i$ representing the task meta info, calculate a product of the one-hot vectors $s_i$, $t_i$, $i_i$ and task encoding matrix ($M_s$, $M_t$, $M_i$) to obtain their respective embeddings $es_i = M_s s_i$, $et_i = M_t s_i$, and $ei_i = M_i i_i$, concatenate $es_i$, $et_i$, and $ei_i$ to obtain the task embedding matrix or task embedding vectors $k_i$, and send the task embedding vectors $k_i$ to the task concatenating module 125. The one-hot vector $s_i$ represents source of the task (here the source is task or question), the one-hot vector $t_i$ represents types of the task (here the type is text), and the vector $i_i$ represents index of the task (the identification of the task).

The task concatenating module 125 is configured to, upon receiving the task feature vectors $\{u_1, u_2, \ldots, u_i, \ldots, u_T\}$ (encoding of the task description) from the BiLSTM module 123 and the task embedding vectors from the task meta info module 124, concatenate the task feature vectors and the task embedding vectors to obtain concatenated task vectors, and send the concatenated task vectors to the dual attention fusion module 150.

The task encoder 130 is configured to retrieve or receive information of a task, encode the source, type, and index of the task into the task encoding matrix ($M_s$, $M_t$, $M_i$), and provide the task encoding matrix to the task meta info module 124 and a context meta info module 146 (described below). In certain embodiments, the task encoder 130 is a task encoding layer, and the task encoding layer includes three embedding layers ($M_s$, $M_t$, $M_i$) to respectively encode the source, type and index of the task. In certain embodiments, the task encoding matrix ($M_s$, $M_t$, $M_i$) is learned during training of the model.

Figure 2B:
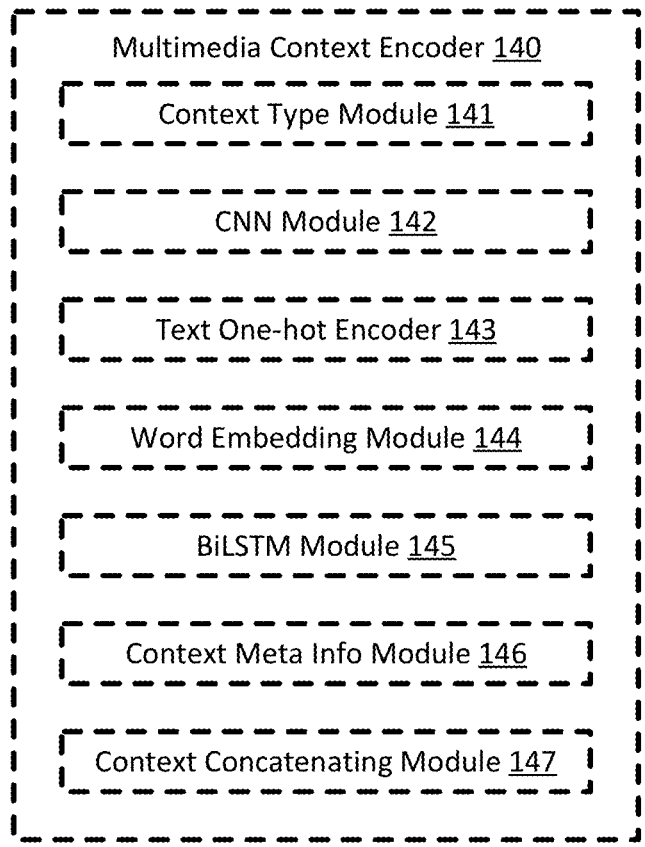
FIG. 2B schematically depicts a multimedia context encoder according to certain embodiments of the disclosure.

The multimedia context encoder 140 is configured to retrieve or receive context related to the task, encode the context to context feature vectors, encode the context meta info and the task encoding matrix into context embedding matrix or context embedding vectors, concatenate the context feature vectors and context embedding vectors to concatenated context vectors, and send the concatenated context vectors to the dual attention fusion module 150. As shown in FIG. 2B, the multimedia context encoder 140 includes a context type module 141, a CNN module 142, a text one-hot encoder 143, a word embedding module 144, a BiLSTM module 145, a context meta info module 146, and a context concatenating module 147. In certain embodiments, the context includes multimedia context, for example, text and images.

The context type module 141 is configured to, upon receiving the context (or target) related to the task, determine whether the context is a text context or an image context, if the context is an image, send the image context to the CNN module 142, and if the context is text, send the text context to the text one-hot encoder 143.

The CNN module 142 is configured to, upon receiving the image context, perform CNN on the image to obtain region feature vectors of the image (context image embeddings), and send the region feature vectors to the BiLSTM module 145. In certain embodiments, the CNN module 142 splits an image into small local regions, and uses CNN to extract visual features of each region from hidden layers of the CNN. As a result, each local region is represented by a corresponding region feature vector, and the list of the region feature vectors are used as input of the BiLSTM module 145. In certain embodiments, the CNN module 142 splits the image into four local regions, top left, top right, bottom left, and bottom right. In certain embodiments, the CNN module 142 splits the image into a large number of regions, for example, dividing the image to 20 parts horizontally and 80 parts vertically, so as to obtain 1600 local regions.

The text one-hot encoder 143 is configured to, upon receiving the textual context, convert each word in the textual context into a one-hot vector, and sends the one-hot vectors to the word embedding module 144. In certain embodiments, the text one-hot encoder 143 is the same as or similar to the text one-hot encoder 121. Kindly note conversion of the text to the one-hot representations is performed in sequence. Thus, the sequential information of the text is maintained.

The word embedding module 144 is configured to, upon receiving the sequential one-hot vectors of the words in the context, embed the one-hot vectors into context embedding vectors (or context text embeddings), and send the context embedding vectors to the BiLSTM module 145. In certain embodiments, the word embedding module 144 is an embedding layer of the multimedia data analysis application 118, and the parameters of the embedding layer are learned during the training of the multimedia data analysis application 118. By word embedding, the dimension of the one-hot vectors is reduced significantly to the dimension of the embedding vectors. In certain embodiments, the word embedding module 144 is the same as or similar to the word embedding module 122.

The BiLSTM module 145 is configured to, upon receiving the region feature vectors (context image embeddings) from the CNN module 142 or the sequential word embedding vectors (context text embeddings) from the word embedding module 144, perform BiLSTM on the region feature vectors or word embedding vectors to obtain context feature vectors, and send the context feature vectors to the context concatenating module 147 and the dual attention fusion module 150.

The context meta info module 146 is configured to, upon retrieving or receiving the meta info of the context, obtain a one-hot vector representing the context meta info, calculate a product of the one-hot vectors of the context meta info and the task encoding matrix to obtain their respective embeddings, concatenate the embeddings to obtain the context embedding matrix or context embedding vectors, and send the context embedding vectors to the context concatenating module 147.

The context concatenating module 147 is configured to, upon receiving the context feature vectors from the BiLSTM module 145 and the context embedding vectors from the context meta info module 146, concatenate the context feature vectors and the context embedding vectors to obtain concatenated context vectors, and send the concatenated context vectors to the dual attention fusion module 150. In certain embodiments, since the context related to the task include multiple set of contexts, each context may be in the text format or image format, there are multiple sets of concatenated context vectors corresponding to the multiple sets of contexts.

The dual attention fusion module 150 is configured to, upon receiving the task feature vectors from the BiLSTM module 123, the concatenated task vectors from the task concatenating module 125, the context feature vectors from the BiLSTM module 145, and the concatenated context vectors from the context concatenating module 147, attend the vectors from the task description and the vectors from the related context, to obtain fusion representation, and send the fusion representation to the final encoding module 160. The task feature vectors from the BiLSTM module 123 is represented by $Q_{proj}$; the concatenated task vector from the task concatenating module 125 is represented by $Q_{enj}$; the context feature vectors from the BiLSTM module 145 is represented by $C_{proj}$, which corresponds to all target context data entries; and the concatenated context vectors from the context concatenating module 147 is represented by $C_{enc}$, which also corresponds to all target context data entries. The task description Q is represented by $\{Q_{proj}, Q_{enc}\}$, and the target context multimedia dataset C is represented by $\{C_{proj}, C_{enc}\}$. To get the fusion representation of task description and target context dataset, the dual attention fusion module 150 first aligns encoded representations of Q and C by normalizing dot-product similarity scores between representations of one with those of other:

$$\text{softmax}(C_{enc}Q_{enc}^T) = S_{cq}, \text{ and softmax}(Q_{enc}C_{enc}^T) = S_{qc}$$

Here $S_{cq}$ and $S_{qc}$ are similarity scores of the SoftMax function, and $Q_{enc}^T$ and $C_{enc}^T$ are the encoding of task description and encoding of the context, respectively.

Then the weighted summations of the information from one sequence that is relevant to a single feature in the other: $S_{cq}^T C_{enc} = C_{sum}$, $S_{qc}^T Q_{enc} = Q_{sum}$, where $S_{cq}^T$ is the coattention weight for task description vector and $S_{qc}^T$ is the coattention weight for context vector. The fusion representations use the same weights to transfer information gained from alignments back to the original sequences: $S_{cq}^T C_{sum} = C_{fus}$, $S_{qc}^T Q_{sum} = Q_{fus}$, where $C_{fus}$ corresponds to the output of 432 in FIG. 4A below and $Q_{fus}$ corresponds to the output of 422 in FIG. 4A below.

The final encoding module 160 is configured to, upon receiving the fusion representation of the task description and the context, feed the fusion representation to BiLSTM, and after performing BiLSTM, send the BiLSTM matrices to the decoder 170. In certain embodiments, in order to compress information from dual fusion representation back to the more manageable dimension d, the final encoding module 160 concatenates all four prior representations for each sequence along the last dimension and feed into separate BiLSTMs:

$$\text{BiLSTM}_{comC}([C_{proj}; C_{enc}; Q_{sum}; C_{fus}]) = C_{com} \in \mathbb{R}^{l \times d},$$
and $$\text{BiLSTM}_{comQ}([Q_{proj}; Q_{enc}; C_{sum}; Q_{fus}]) = Q_{com} \in \mathbb{R}^{m \times d},$$

where $C_{com}$ is the final representation of the context, and $Q_{com}$ is the final representation of the task description. The final encoding module 160 then sends these matrices to the decoder 170 to generate the predictions.

Figure 2C:
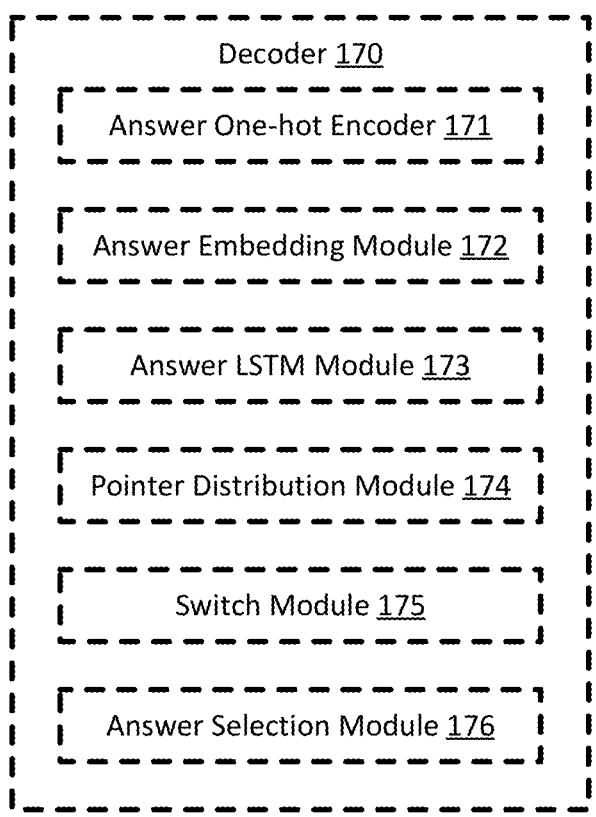
FIG. 2C schematically depicts a decoder according to certain embodiments of the disclosure.

The decoder 170 is configured to, upon receiving the matrices from the final encoding module 160, generate an answer for the task. In certain embodiments, the disclosure need to generate tokens that are not in the context or the question. In response, the disclosure provides access to v additional vocabulary tokens. The disclosure obtains distributions over tokens in the context, question, and this external vocabulary, respectively. At each step, the decoder network decides between three choices: generating from the vocabulary, pointing to the task description, and pointing to the context. The model can learn to switch between the three options. In certain embodiments, these distributions are extended to cover the union of the tokens in the context, question, and external vocabulary. Two scalar switches regulate the importance of each distribution in determining the final output distribution. As shown in FIG. 2C, the decoder 170 includes an answer one-hot encoder 171, an answer embedding module 172, an answer LSTM module 173, a pointer distribution module 174, a switch module 175, and an answer selection module 176.

The answer one-hot encoder 171 is configured to, given any time step t in generating answers, convert already generated answers till previous time step t−1 as text to their one-hot encoding representations, and send the one-hot encoding representations to the answer embedding module 172. In certain embodiments, the answer one-hot encoder 171 does not need to be executed for generating the first word in the answer.

The answer embedding module 172, upon receiving the one-hot encoding representations of the already generated answers at time step t−1, apply these one-hot encoding representations of document to a word embedding layer to extract each word's embedding as its distributional vector representation, and send the word embeddings to the LSTM module 173. Kindly note the size of the word embedding layer is V×d, V denotes the size of the answer vocabulary and d denotes the embedding size of each word.

The answer LSTM module 173 is configured to, upon receiving the embedded words, feed each word's embedding into a one directional LSTM to capture dependency between words in the sequence, concatenate all hidden states generated till previous time step t−1 as intermediate decoder state, and send the intermediate decoder state to the pointer distribution module 174.

The pointer distribution module 174 is configured to, upon receiving the intermediate decoder state, combine the intermediate decoder state with final encodings of question description (task description) to generate attentions for each word vector in task description, in other words, task description pointer distribution; combine the intermediate decoder state with final encodings of context to generate attentions for each word in context (if in text format), in other words, context pointer distribution; combine the intermediate decoder state with final encodings of context as well as context attention as input to a fully connected layer to generate vocabulary distribution; and send the distributions to the switch module 175.

The switch module 175 is configured to, upon receiving the distributions, learn two scalars (corresponds to scalars β and γ in FIG. 4B below). The first scalar is called vocab pointer switch, which regulates the probability that answers are generated from external vocabulary versus context or task description, and the second scalar is called context-task description switch, which regulates the probability that answers are generated from context versus task description. In certain embodiments, the vocab pointer switch is learned by combing the current intermediate decoder state, context final encoding output as well as already generated answer word's embedding; the context-task description switch is learned by coming the current intermediate decoder state, task description final encoding output as well as already generated answer word's embedding. After learning of the switches, the switch module 175 is further configured to provides the learned switches to the answer selection module 176.

The answer selection module 176 is configured to, upon obtaining these two switches, use them as weights for averaging context pointer distribution, task description pointer distribution as well as vocabulary distribution to get the final answer distribution. In certain embodiments, by selecting the word with highest probability in the vocabulary, the answer selection module 176 produces predicted final answer sequence one word at a time.

In one example, the task is a question asking "whether a customer has a positive or negative review on a product," and the task related context is "the product is very good!"

The decoder 170 is able to generate the answer from both the task and the context, where the "positive" in the answer come from the task.

Referring back to FIG. 1, the multimedia data analysis application 118 may further includes the user interface 180. The user interface 180 is configured to provide a use interface or graphic user interface in the computing device 110. In certain embodiments, a manager is able to configure parameters for the training of the multimedia data analysis application 118. In certain embodiments, a user is able to enter a task (or a question, or a query) via the interface 180, to obtain an answer from the multimedia data analysis application 118.

The multimedia data analysis application 118 may further includes the database 190 to store training questions and context related to the questions. The context may include customer comments, product reviews, product questions-answer pairs, product specifications, as well as a broad range of context that are not product specific. Some of the data stored in the database 190 are used for training, and some other data or all the data stored in the database 190 can be used for responding to a task. In certain embodiments, the database 190 is stored in computing devices other than the computing device 110, or stored in other computing servers, and the multimedia data analysis application 118, when in operation, is able to retrieve or receive data from the remote database 190.

In certain embodiments, the modules of the task description encoder 120, the task encoder 130, the multimedia context encoder 140, the dual attention fusion module 150, the final encoding module 160, and the decoder 170 are designed as different layers of one integrated network, each layer corresponds a specific function.

In certain aspects, the present disclosure relates to a method for training the multimedia data analysis application 118. In certain embodiments, the training of the application is performed by a computing device, such as the computing device 110 shown in FIG. 1. In certain embodiments, the training is performed using labeled questions and corresponding answers, together with related data contexts.

Figure 3A:
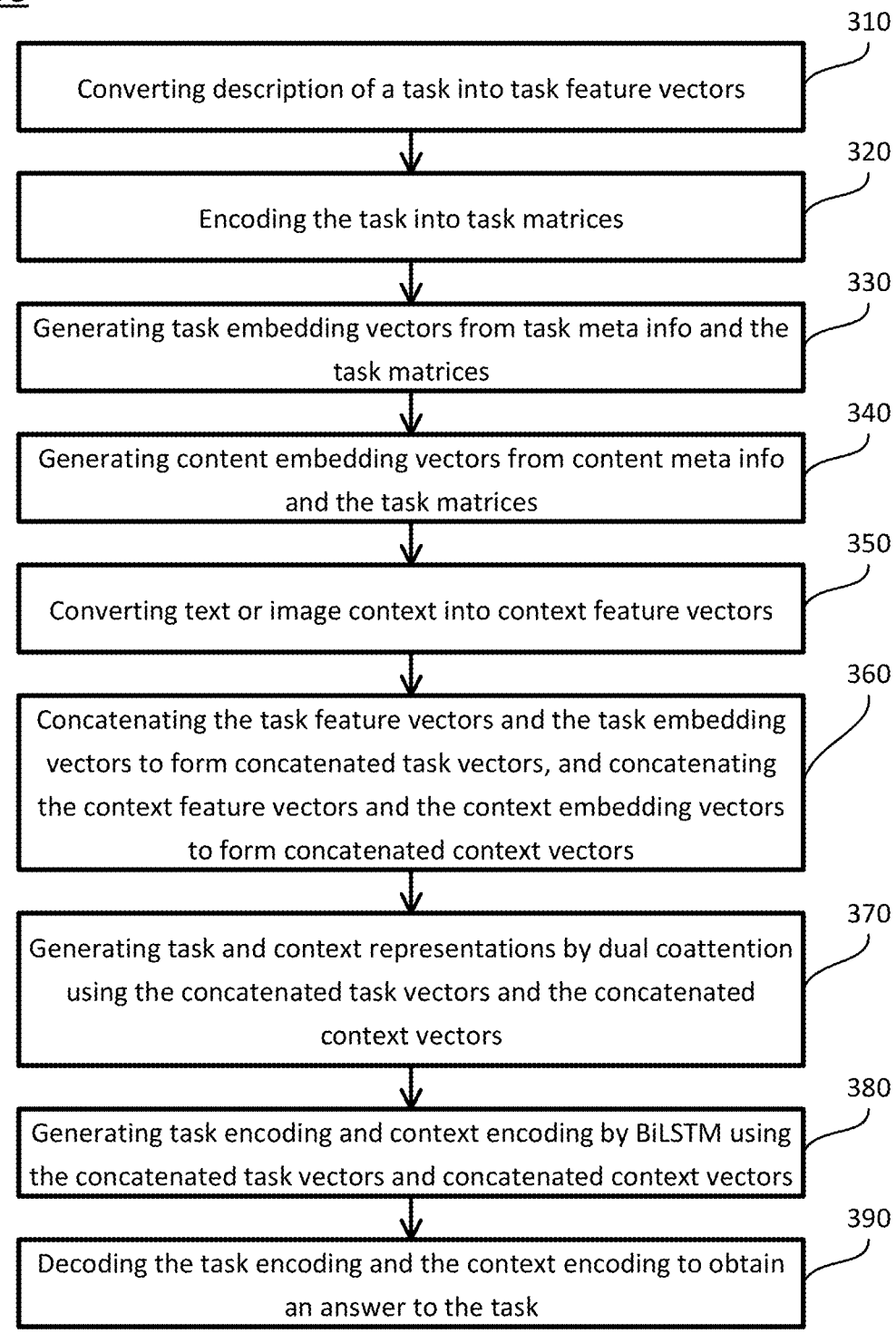
FIG. 3A schematically depicts a multimedia data analysis process according to certain embodiments of the present disclosure.

In certain aspects, the present disclosure relates to a method for applying the multimedia data analysis application 118. FIG. 3A schematically depicts a multimedia data analysis process according to certain embodiments of the present disclosure. In certain embodiments, the process is performed by a computing device, such as the computing device 110 shown in FIG. 1, and specifically by the multimedia data analysis application 118. It should be particularly noted that, unless otherwise stated in the present disclosure, the steps of the forecasting process or method may be arranged in a different sequential order, and are thus not limited to the sequential order as shown in FIG. 3A.

After the multimedia data analysis application 118 is well-trained, it is ready for data analysis, for example, provided an answer to a question based on related multimedia data.

At procedure 310, when a task is queried by a user, the task description encoder 120 retrieves or receives description of the task, and convert the task description into task feature vectors. In certain embodiments, the task is a question, and the description is in a text format.

At procedure 320, when the task is available, the task encoder 130 encodes the task into task matrices. In certain embodiments, the task matrices include a source matrix, a type matrix, and an index matrix.

At procedure 330, the task encoder 130 retrieves task meta info, converts the task meta info into one-hot vectors, and generates a task embedding matrix or task embedding vectors, which is a product of the task meta info one-hot vectors and the task matrices.

At procedure 340, the task encoder 130 retrieves context meta info, converts the context meta info into one-hot vectors, and generates a context embedding matrix or context embedding vectors, which is a product of the context meta info vectors and the context matrices. The context is related to the task. For example, if the task is the question on a product, the context may include the product specification from a product database, comments and reviews of the product, web publications citing the product, as well as information related to other product that are in the same category of the product. The context may in the form of text, images, videos. When the videos are available, the videos may be processed as a plurality of images.

At procedure 350, when the task is available, the multimedia context encoder 140 retrieves context related to the task, and convert the context into context feature vectors. In certain embodiments, the context includes text and images, and each set of text or image information is converted to one set of the context feature vectors.

At procedure 360, the task description encoder 120 concatenates the task feature vector and the task embedding vectors to obtain concatenated task vectors and sends the concatenated task vectors to the dual attention fusion module 150, the multimedia context encoder 140 concatenates the context feature vector and the context embedding vectors to obtain concatenated context vectors, and sends the concatenated context vectors to the dual attention fusion module 150.

At procedure 370, the dual attention fusion module 150 utilizes attention between the task and the context, generates fusion representation from the concatenated task vectors and the concatenated context vectors, and sends the fusion representations to the final encoding module 160.

At procedure 380, in response to receiving the fusion representations of the task and the contexts, the final encoding module 160 performs BiLSTM using the fusion representation to obtain task encodings and context encodings, and sends the encodings (BiLSTM matrices) to the decoder 170.

At procedure 390, in response to receiving the task encodings and the context encodings, the decoder 170 decodes the encodings to obtain an answer to the task.

By the above operation, the multimedia data analysis application 118 is able to provide answers to tasks queried by the users. The answers are derived from task data, context data, and extrinsic data. By the combination of these data, especially information from the task, the generated answer is more accurate.

Figure 3B:
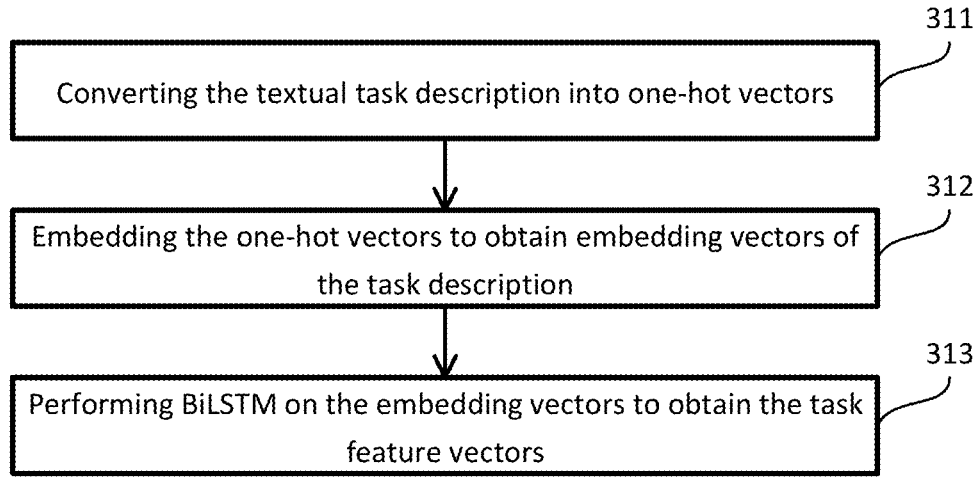
FIG. 3B schematically depicts the process of converting task description to task feature vectors according to certain embodiments of the present disclosure.

FIG. 3B schematically depicts the process 310 according to certain embodiments of the present disclosure. It should be particularly noted that, unless otherwise stated in the present disclosure, the steps of the process 310 may be arranged in a different sequential order, and are thus not limited to the sequential order as shown in FIG. 3B.

At procedure 311, upon receiving the task, specifically the description of the task, the text one-hot encoder 121 converts the textual task description, i.e., the sequential words $\{w_1, w_2, \ldots, w_i \ldots w_T\}$ into one-hot vectors $\{v_1, v_2, \ldots, v_i \ldots v_T\}$ using a fixed-sized vocabulary, and sends the one-hot vectors to the word embedding module 122.

At procedure 312, upon receiving the one-hot vectors $\{v_1, v_2, \ldots, v_i \ldots, v_T\}$, the word embedding module 122 embeds the one-hot vectors into embedding vectors $\{e_1, e_2, \ldots, e_i, \ldots, e_T\}$ of the task description, and sends the embedding vectors to the BiLSTM module 123. In certain embodiments, the word embedding module 122 is an embedding layer.

At procedure 313, upon receiving the embedding vectors, the BiLSTM module 123 performs BiLSTM on the embedding vectors to obtain task feature vectors $\{u_1, u_2, \ldots, u_i, \ldots, u_T\}$, and sends the task feature vectors to the task concatenating module 125 and the dual attention fusion module 150.

The task concatenating module 125 would concatenate the task feature vectors $\{u_1, u_2, \ldots, u_i, \ldots, u_T\}$ with the task embedding vectors (concatenated $es_i$, $et_i$, and $ei_i$), at the process 360 to obtain concatenated task vector. The dual attention fusion module 150 would use the concatenated task vector and the task feature vectors $\{u_1, u_2, \ldots, u_i, \ldots, u_T\}$ to perform dual coattention at procedure 370.

Figure 3C:
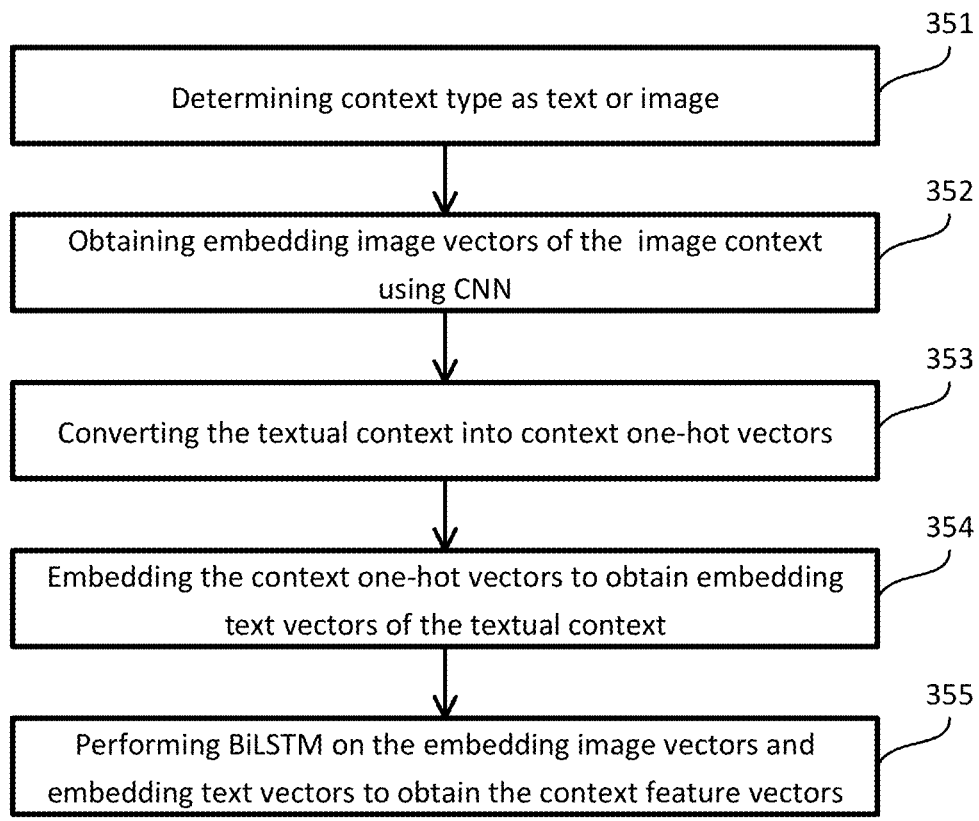
FIG. 3C schematically depicts the process of converting context to context feature vectors according to certain embodiments of the present disclosure.

FIG. 3C schematically depicts the process 350 according to certain embodiments of the present disclosure. It should be particularly noted that, unless otherwise stated in the present disclosure, the steps of the process 320 may be arranged in a different sequential order, and are thus not limited to the sequential order as shown in FIG. 3C.

At procedure 351, upon retrieving the context related to the task, the context type module 141 determines whether the context is a textual context or an image context, sends the image context to the CNN module 142, and sends the textual context to the text one-hot encoder 143. In certain embodiments, the context includes multiple textual contexts and multiple image contexts, and each of the multiple contexts is processed accordingly.

At procedure 352, upon receiving one of the image contexts, the CNN module 142 performs CNN on the image to obtain embedding image vectors (region feature vectors or), and sends the embedding image vectors to the BiLSTM module 145. In certain embodiments, the image is divided into N regions, and each region is subjected to the CNN to extract features to obtain the feature vectors $\{r_1, r_2, \ldots, r_i, \ldots, r_N\}$, where $r_i$ is the feature vector represents the i-th region of the image.

At procedure 353, upon receiving one of the textual contexts, the text one-hot encoder 143 converts the textual context description into one-hot vectors, and sends the one-hot vectors to the word embedding module 144.

At procedure 354, upon receiving the one-hot vectors, the word embedding module 144 embeds the one-hot vectors into embedding text vectors of the textual context, and sends the embedding text vectors to the BiLSTM module 145. In certain embodiments, the word embedding module 144 is an embedding layer.

At procedure 355, upon receiving the embedding image vectors from the CNN module 142 or the embedding text vectors from the word embedding module 144, the BiLSTM module 145 performs BiLSTM on the embedding vectors to obtain context feature vectors, and sends the context feature vectors to the context concatenating module 147 and the dual attention fusion module 150.

The context concatenating module 147 would, for each of the image context or the text context, concatenate the context feature vectors with the context embedding matrix at the process 360 to obtain concatenated context vector. The dual attention fusion module 150 would use the concatenated context vector and the context feature vectors to perform dual coattention at procedure 370.

Figure 3D:
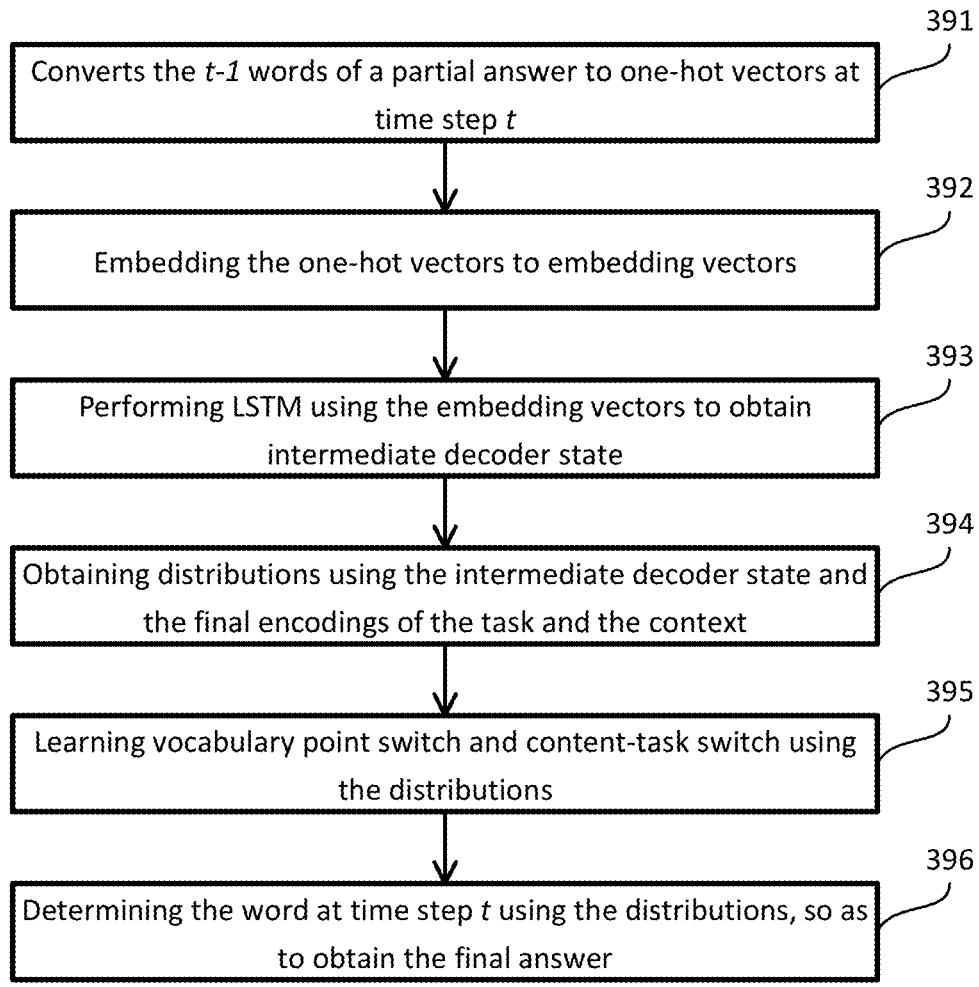
FIG. 3D schematically depicts the process of decoding task encoding and context encoding to obtain an answer to a task according to certain embodiments of the present disclosure.

FIG. 3D schematically depicts the process 390 according to certain embodiments of the present disclosure. It should be particularly noted that, unless otherwise stated in the present disclosure, the steps of the process 390 may be arranged in a different sequential order, and are thus not limited to the sequential order as shown in FIG. 3D.

When the decoder 170 receives the BiLSTM matrices of the task and the contexts, the decoder 170 processes the matrices to generate an answer. In certain embodiments, the decoder 170 generates the answer word by word. Thus, after time step t–1, the partial answer includes t–1 words. In certain embodiments, the end of sentence token (e.g. </end>) is in the vocabulary of decoder model. Once the decoder model generate the end of sentence token, the answer generation process end. Further, for generating the first word of the answer, there is no need to run the LSTM 434.

At procedure 391, at time step t, the answer one-hot encoder 171 converts the t–1 words of the partial answer to sequential one-hot vectors, and sends the one-hot vectors to the embedding module 172.

At procedure 392, upon receiving the one-hot vectors, the embedding module 172 embeds the one-hot vectors into embedding vectors of the partial answer, and sends the embedding vectors to the LSTM module 173.

At procedure 393, upon receiving the embedding vectors of the partial answer from the embedding module 172, the LSTM module 173 performs one directional LSTM on the embedding vectors to capture dependency between the words in the partial answer, and concatenates all hidden states in the LSTM to obtain an intermediate decoder state, and sends the intermediate decoder state to the pointer distribution module 174.

At procedure 394, upon receiving the intermediate decoder state, the pointer distribution module 174 combines the intermediate decoder state with final encodings of task description to generate attentions for each word vector in the task description, i.e., task description pointer distribution; combines the intermediate decoder state with final encodings of context to generate attentions for each word in context (if in text format), i.e., context pointer distribution; combines the intermediate decoder state with final encodings of context (if in image format) as well as context attention as input to a fully connected layer to generate vocabulary distribution; and sends the distributions to the switch module 175.

At procedure 395, upon receiving the distributions, the switch module 175 learns the vocab pointer switch and the context-task switch, and sends the switches to the answer selection module 176. The vocab pointer switch regulates the probability that answers are generated from external vocabulary versus context or task description, and the switch module 175 learns the vocab pointer switch by combing the current intermediate decoder state, context final encoding output as well as already generated answer word's embedding. The context-task description switch regulates the probability that answers are generated from context versus task description, and the switch module 175 learns the context-task description switch by coming the current intermediate decoder state, task description final encoding output as well as already generated answer word's embedding.

At procedure 396, upon receiving the vocab pointer switch and the context-task switch, the answer selection module 176 use them as weights for averaging context pointer distribution, task description pointer distribution as well as vocabulary distribution to get the final answer distribution, so as to determine the word at time step t. By repeating the above steps, the words in the answer can be selected one by one, and the final complete answer would be provided to the user who assigned the task or asked the question.

Kindly notes that the methods described above are not limited to the embodiments shown in FIGS. 3A-3D, and other reasonable variations may be applied.

Figure 4A:
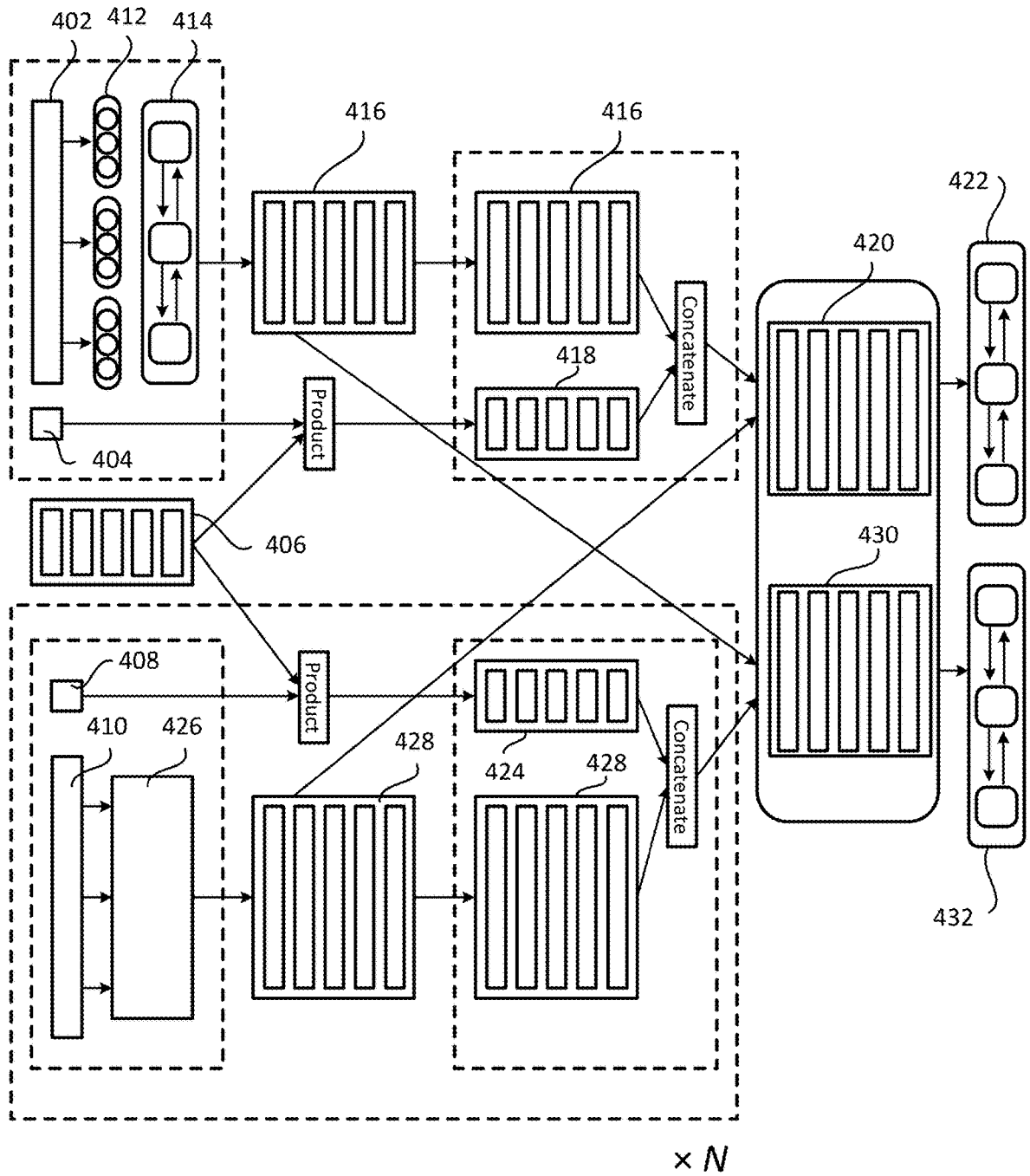
FIG. 4A schematically depict an encoder part of an attention-based fusion network for multimedia data semantic analysis according to certain embodiments of the present disclosure.
Figure 4B:
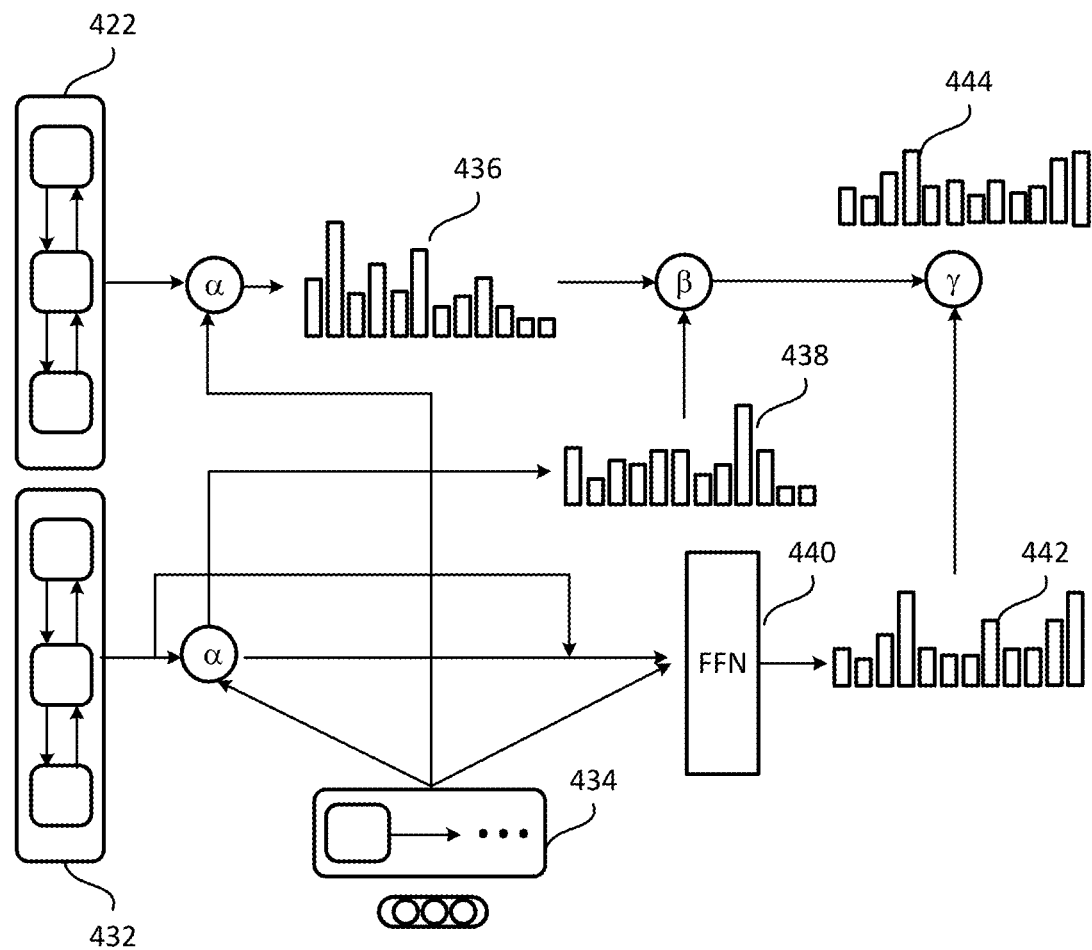
FIG. 4B schematically depict an decoder part of the attention-based fusion network for multimedia data semantic analysis according to certain embodiments of the present disclosure.

FIGS. 4A and 4B schematically depict an attention-based fusion network for multimedia data semantic analysis according to certain embodiments of the present disclosure, where FIG. 4A shows the encoder part, and FIG. 4B shows the decoder part.

As shown in FIG. 4A, when a task is available, which could be a textual question, the task is analyzed by the multimedia data analysis application 118. The description of the task includes text 402 and task meta info or task metadata 404. The text 402 includes sequential textual description of the task, such as a question in a text format. The task meta info 404 is information of the task, such as source, type, and index of the task. A task encoder 406 is included in the multimedia data analysis application 118, and the task encoder 406 includes three embedding layers for encoding task specific information. The three embedding layers are a source matrix $M_s$ listing different sources of tasks, a type matrix $M_t$ listing different types of tasks, and an index matrix $M_i$ listing different indices of tasks. The multimedia data analysis application 118 is able to retrieve task related data, that is, context related to the task. The context includes context meta info 408 and multimedia data 410. The context meta info 408 is information of the context, such as source, type, and index of the context. The multimedia data 410 of the context includes textual data and image data.

When the multimedia data analysis application 118 receives or retrieves the text 402, it converts each word in the text 402 to a one-hot vector, and then inputs the sequential one-hot vectors of the text 402 into a word-embedding layer to form sequential embedding vectors 412. The sequential embedding vectors 412 is subjected to BiLSTM analysis by a BiLSTM 414, so as to obtain task feature vectors 416.

The multimedia data analysis application 118 further converts the task meta info 404 to one-hot vectors, which include one-hot vector $s_i$ indicating source (here the source is task); one-hot vector $t_i$ indicating type of the task (here the type is text); and one-hot vector $i_i$ indicating index of the task (here identification of the task). The task encoder 406 includes three embedding layers $M_s$, $M_t$, and $M_i$ for encoding task specific information. The parameters of the task encoder 406 can be learned during the training of the multimedia data analysis application 118. The multimedia data analysis application 118 multiplies the one-hot vectors of the task meta info 404 and the matrices of the task encoder 406 to form the products $es_i$, $et_i$, and $ei_i$, and then concatenates the products into task embedding vectors (or task embedding matrix) 418, i.e., $k_i$.

When the task feature vectors 416 and the task embedding vectors 418 are available, the multimedia data analysis application 118 concatenates the task feature vectors 416 and the task embedding vectors 418 into concatenated task feature vectors.

To get answers to the task, the multimedia data analysis application 118 retrieves the context. In certain embodiments, the multimedia data analysis application 118 converts the context meta info 408 to one-hot vectors representing source, type and index of the context, and multiples the one-hot vectors with the matrices of the task encoder 406 to obtain products, and concatenates the products into context embedding vectors (or context embedding matrix) 424.

For the multimedia data 410, the multimedia data analysis application 418 uses the multimedia encoder 426 to obtain context feature vectors 428. When the context embedding vectors 424 and the context feature vectors 428 are available, the multimedia data analysis application 118 concatenates the context embedding vectors 424 and the context feature vectors 426 into concatenated context vectors.

As shown in FIG. 4A, the context may include multiple different contexts, such as N contexts, and each of the N contexts can be processed this way to form corresponding concatenated context vectors. Here N is a positive integer. Further, since each of the N may be a text, an image, or a combination, the process for producing the context feature vector 426 may be different.

Figure 5A:
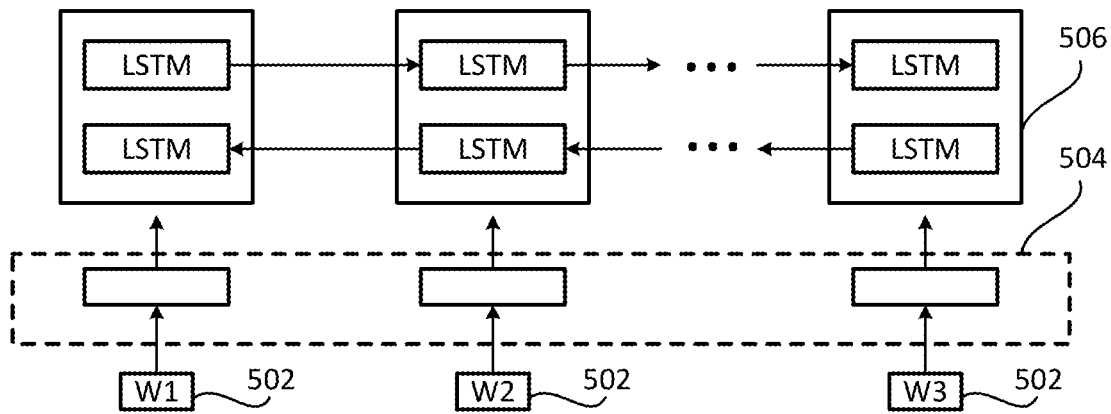
FIG. 5A schematically depicts a process of using a multimedia encoder to encode textual context according to certain embodiments of the present disclosure.

FIG. 5A schematically shows the process of using the multimedia encoder 426 to process textual context. The textual context includes sequential words 502, and the multimedia encoder 426 includes a word embedding module 504 and a BiLSTM module 506. As shown in FIG. 5A, the sequential words 502 are converted into one-hot vectors, and the one-hot vectors are applied to the word embedding module 504 to extract each word's embedding as its distributional vector representation. The size of the word embedding layer is V×d, where V denotes the size of the vocabulary and d denotes the embedding size of each word. In certain embodiments, the task textual input embedding and the context textual input embedding share the same vocabulary. Each of the words embeddings is inputted to one BiLSTM RNN unit of the LSTM module 506 to capture dependency between the words in sequence. By concatenating all hidden states output of the BiLSTM module 506, the context feature vectors 428 are obtained. In certain embodiments, the process performed by the embedding module 510 and the BiLSTM module 520 shown in FIG. 5A is the same as or similar to the process performed by the embedding module 412 and the BiLSTM module 414 shown in FIG. 4A.

Figure 5B:
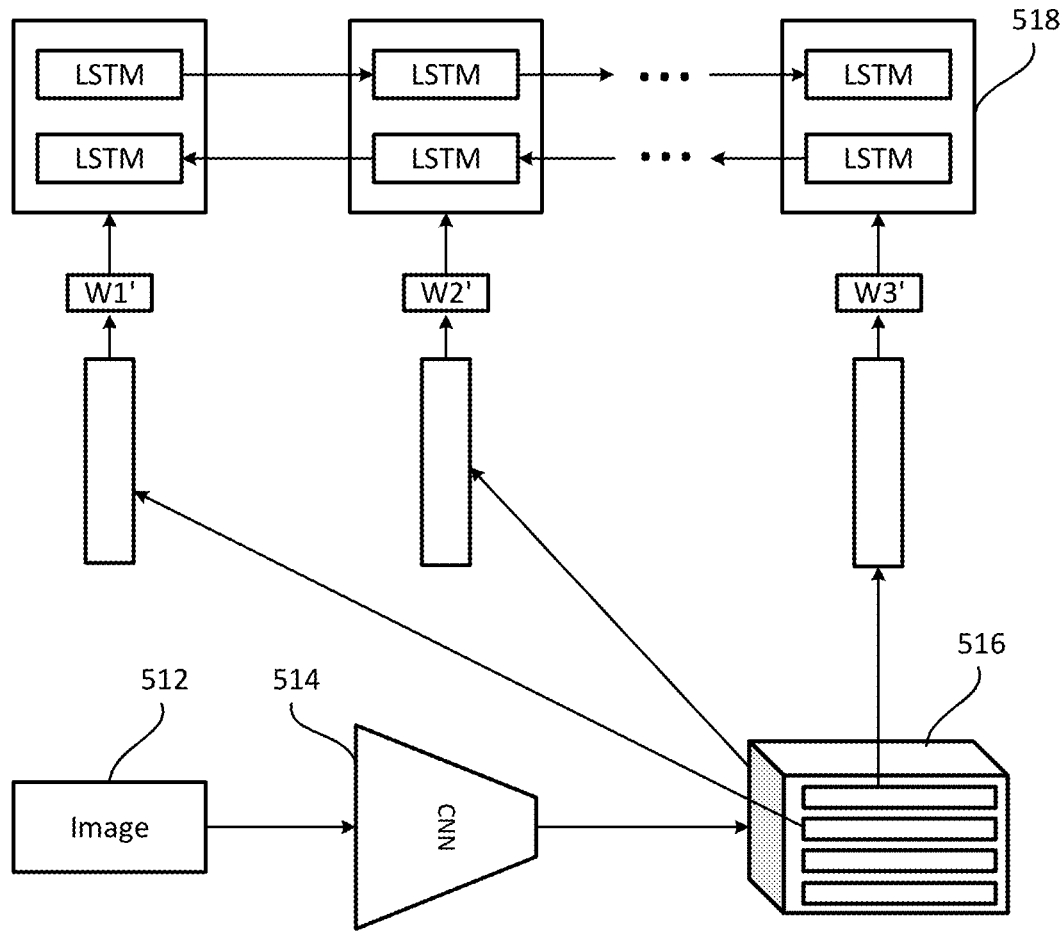
FIG. 5B schematically depicts a process of using a multimedia encoder to encode image context according to certain embodiments of the present disclosure.

FIG. 5B schematically shows the process of using the multimedia encoder 426 to process image context. As shown in FIG. 5B, the multimedia encoder 426 further includes a CNN module 514 and a BiLSTM module 518. In certain embodiments, the BiLSTM module 518 is independent from the BiLSTM module 506. When an image 512 is inputted to the CNN module 514, the CNN module 514 divides the image 512 into small local regions and considers each region equivalent to a word. Each region is subjected to convolutional neural network analysis by the CNN 514, and the hidden layer (e.g. last pooling layer's output) is taken as a vector representation for the region. The local regional vectors 516 extracted from above do not yet have global information available to them. Without global information, their representational power is quite limited, with simple issues like object scaling or locational variance causing accuracy problems. To solve this problem, the multimedia data analysis application 118 further feeds these CNN vectors 516 to the BiLSTM 518 which allows information to propagate from neighboring image patches, capturing spatial information and keeping the global feature. Each feature vector corresponding to a local region is regarded equivalent to one word and is inputted to one BiLSTM RNN unit of the BiLSTM module 518. By concatenating all hidden states output of the BiLSTM module 518, the context feature vectors 428 are obtained.

Referring back to FIG. 4A, when the task feature vectors 416, the concatenated task vectors, the context feature vectors 428, and the concatenated context vectors are available, the multimedia data analysis application 118 further performs dual coattention fusion using those data.

In certain embodiments, in step 1, the multimedia application 118 uses a coattention mechanism that attends to the task description and context simultaneously and finally fuses both attention contexts. The application first computes the affinity matrix, which contains affinity scores corresponding to all pairs of context embedding vectors and task description vectors. The affinity matrix is normalized row-wise to produce the attention weights $A^Q$ across the document for each vector in the task description, and column-wise to produce the attention weights $A^D$ across the task description for each embedding vector in the context. Next, in step 2, the application computes the summaries, or attention contexts $C^Q$, of the context in light of each word vector of the task description by calculate the product of $A^Q$ and context vector D. In step 3, the application similarly computes the summaries Q times $A^Q$ of the task description in light of each embedding vector of the context. The application also computes the summaries $C^Q A^D$ of the previous attention contexts in light of each word of the context. These two operations can be done in parallel. One possible interpretation for the operation $C^Q A^D$ is the mapping of task description encoding into space of context encodings. The application defines $C^D$, a co-dependent representation of the task description and context, as the coattention context. The application repeats the same steps 1-3 as above to get coattention question $A^c$.

The last step is the fusion of temporal information to the coattention context and via bidirectional LSTMs 422 and 432. By concatenating the initial embedding vectors 416 and 428, coattended vectors 420 and 430, and final hidden state vector of the BiLSTMs 422 and 432, the application obtains the deep and general representation of both question description and context.

The encoded representations of the task description and the context are then applied to a decoder shown in FIG. 4B to generate an answer to the task based on the context. In certain embodiments, the model of the disclosure is able to generate tokens that are not in the context or the question (task). To reach the goal, the model has access to v additional vocabulary tokens, and in certain embodiments, the same vocabulary is shared by both the encoder and the decoder. Thus, the disclosure can obtain distributions over tokens in the context, question, and this external vocabulary, respectively.

At each step, the decoder network decides between three choices: generating from the vocabulary, pointing to the task description, and pointing to the context. The model can learn to switch between the three options. These distributions are extended to cover the union of the tokens in the context, question, and external vocabulary. Two scalar switches regulate the importance of each distribution in determining the final output distribution. The process of pointer decoder are detailed in the following steps.

In step 1, given any time step t in generating answers, already generated answers till previous time step t−1 as text are converted to their one-hot encoding representations. The decoder applies these one-hot encoding representations of document to word embedding layer in order to extract each word's embedding as its distributional vector representation. Note the size of word embedding layer is V×d, V denotes the size of the answer vocabulary and d denotes the embedding size of each word.

In step 2, the decoder feeds each word's embedding into a one directional LSTM 434 to capture dependency between words in the sequence. All hidden states generated till previous time step t−1 will be concatenated together as intermediate decoder state.

In step 3, the intermediate decoder state is combined with final encodings of question description to generate attentions for each word vector in task description, in other words, task description pointer distribution 436. The intermediate decoder state is combined with final encodings of context to generate attentions for each word in context (if in text format), in other words, context pointer distribution 438. The intermediate decoder state is combined with final encodings of context as well as context attention as input to a fully connected layer 440 to generate vocabulary distribution 442. In certain embodiments, the generated vocabulary distribution 442 is based on context, either text or image.

In step 4, two scalars are learnt, the first one is called vocab pointer switch, which regulates the probability that answers are generated from external vocabulary versus context or question description, and the second one is called context-task description switch, which regulates the probability that answers are generated from context versus task description. The vocab pointer switch is learnt by combing the current intermediate decoder state, context final encoding output as well as already generated answer word's embedding. The context-task description switch is learnt by coming the current intermediate decoder state, task description final encoding output as well as already generated answer word's embedding.

In step 5, after obtaining these two switches, the decoder uses them as weights for averaging context pointer distribution 438, task description pointer distribution 436 as well as vocabulary distribution 442 to get final answer distribution 444. The word at time step t can then be selected from the final answer distribution 444.

In step 6, by selecting the word with highest probability in the vocabulary, the disclosure produces predicted final answer sequence one word at a time.

The $\alpha$, $\beta$ and $\gamma$ in FIG. 4B are hyperparameters and can be learned by training. In certain embodiments, when the value of $\alpha$ is large, the answer more probably resides in the task, when the value of $\beta$ is large, the answer more probably resides in the context. In certain embodiments, $\gamma$ is the combination of weights over final question and context distribution.

In certain embodiments, an alternative solution can integrate a system consists of a set of models for different tasks, i.e., each model is in charge of a specific semantic analysis task only. For example, to fulfill the sentiment analysis and named entity extraction, and scene classification, tree distinct models need be trained respectively, and apply the corresponding model for different task.

In certain aspects, the present disclosure relates to a non-transitory computer readable medium storing computer executable code. In certain embodiments, the computer executable code may be the software stored in the storage device 116 as described above. The computer executable code, when being executed, may perform one of the methods described above.

Certain embodiments of the preset disclosure, among other things, have the following beneficial advantages. Firstly, by interpreting multimedia data related to an object, either in text format or in image format, the disclosure provides accurate prediction on attributes of the object based on those multimedia data. For example, post on e-commerce platform or social network can be incorporated and explained efficiently. Secondly, attributes of the object are derived from task on the object, context related to the object, and external vocabulary, thus expanding range of attributes and improving accuracy of prediction. For example, if a customer asks a question on a product, the answer can be generated based on the question itself, the specification, review, and comments on the product, as well as external vocabularies. Thirdly, the disclosure uses a dual attention mechanism to extract information based on the interactions between the task on the object, the multimedia data related to the object, and external data, and the interactions make the prediction more accurate. Fourthly, multimedia data is processed using a same multimedia encoder, where an image can be divided into local regions, and each region is processed as equivalent to a word in a text, so that textual and image information can be processed in later stages the same way.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

REFERENCES

1. CAIMING XIONG, STEPHEN MERITY, RICHARD SOCHER. Dynamic memory networks for visual and textual question answering, Proceedings of the 33rd International Conference on Machine Learning, 2016.
2. CAIMING XIONG, VICTOR ZHONG, RICHARD SOCHER, Dynamic coattention networks for question answering, ICLR, 2017.
3. RICHARD SOCHER, ANDREJ KARPATHY, QUOC V LE, CHRISTOPHER D. MANNING, ANDREW Y. NG, Grounded compositional semantics for finding and describing images with sentences, Association for Computing Linguistics (ACL), 2014.
4. HYEONSEOB NAM, JUNG-WOO HA, JEONGHEE KIM, Dual attention networks for multimodal reasoning and matching, arXiv:1611.00471, 2016.
5. DONGFEI YU, JIANLONG FU, TAO MEI, YONG RUI, Multi-level attention networks for visual question answering, CVPR, 2017.
6. ALEX KRIZHEVSKY, ILYA SUTSKEVER, GEOFFREY E. HINTON, ImageNet classification with deep convolutional neural networks, NIPS, 2012.
7. ANTONIO RUBIO, LONGLONG YU, EDGAR SIMO-SERRA, FRANCESC MORENO-NOGUER, Multimodal embedding for main product detection in fashion, The IEEE International Conference on Computer Vision (ICCV), 2017, pp. 2236-2242.

What is claimed is:

1. A system for multimedia data analysis, comprising:
a computing device, comprising a processor and a storage device storing computer executable code, wherein the computer executable code, when executed at the processor, is configured to:
receive a task comprising task description and task meta info, wherein the task description is in text format, and the task meta info comprises source, type and index of the task;
provide multimedia context related to the task, wherein the multimedia context comprises context text, context image, and context meta info comprising source, type and index of the context;
embed sequential words of the task description into task description embeddings, perform a first neural network on the task description embeddings to obtain task feature vectors, encode the task meta info into task embedding vectors, and concatenate the task feature vectors and the task embedding vectors into concatenated task vectors;
when the context comprises the context text, embed sequential words of the context text into context text embeddings, perform a second neural network on the context text embeddings to obtain context feature vectors, encode the context meta info into context embedding vectors, and concatenate the context feature vectors and the context embedding vectors into concatenated context vectors;
when the context comprises the context image, perform a third neural network on the context image to obtain context image embeddings, perform a fourth neural network on the context image embeddings to obtain the context feature vectors, encode the context meta info into the context embedding vectors, and concatenate the context feature vectors and the context embedding vectors into the concatenated context vectors;
perform dual coattention on the task feature vectors, the concatenated task vectors, the context feature vectors and the concatenated context vectors, to obtain attended task vectors and attended context vectors;
perform a fifth neural network on the attended task vectors and the attended context vectors to obtain task encoding and context encoding; and
decode the task encoding and the context encoding to obtain an answer to the task.

2. The system of claim 1, wherein the computer executable code is configured to encode the task meta info into task embedding vectors by:
converting the task meta info into task one-hot vectors; and
multiplying the task one-hot vectors and task matrices to form the task embedding vectors,
wherein the task matrices comprise a source matrix representing sources of the task, a type matrix representing type of the task, and an index matrix representing indices of the task.

3. The system of claim 2, wherein the computer executable code is configured to encode the context meta info into context embedding vectors by:
converting the context meta info into context one-hot vectors; and
multiplying the context one-hot vectors and the task matrices to form the context embedding vectors.

4. The system of claim 1, wherein each of the first, the second, the fourth and the fifth neural networks is a bi-directional long-short term memory network (BiLSTM), and the third neural network is a convolutional neural network (CNN).

5. The system of claim 4, wherein the computer executable code is configured to perform CNN on the context image to obtain context image embeddings by:
dividing the context image into a plurality of regions;
performing CNN on each of the regions; and
taking hidden layers of the CNN as the context image embeddings.

6. The system of claim 5, wherein a number of the regions in the context image is learned by the CNN.

7. The system of claim 1, wherein the computer executable code is configured to decode the task encoding and the context encoding to obtain the answer to the task by:
  embedding words of a part of the answer at previous time steps to obtain embedded partial answer;
  applying one directional LSTM on the embedded partial answer to obtain intermediate decoder state;
  combining the intermediate decoder state with the task encoding to obtain distribution of task word vectors in the task encoding;
  combining the intermediate decoder state with the context encoding to obtain distribution of context word vectors in the context encoding;
  combining the intermediate decoder state with the context encoding and context attention to obtain a combination, and apply a fully connected layer on the combination to obtain vocabulary distribution;
  generating an output distribution based on distribution of the task word vectors, the distribution of the context word vectors, and the vocabulary distribution; and
  selecting a next word for the part of the answer from the output distribution.

8. The system of claim 7, wherein the fully connected layer is a feed forward network (FFN).

9. The system of claim 7, wherein the step of generating the output distribution is performed by:
  learning a vocabulary pointer switch regulating a probability that the answer is generated from external vocabulary versus the context or the task;
  learning a context-task switch regulating a probability that the answer is generated from the context versus the task description; and
  averaging the distribution of the task word vectors, the distribution of the context word vectors, and the vocabulary distribution using the vocabulary pointer switch and the context-task switch as weights, so as to obtain the output distribution.

10. The system of claim 7, wherein model in the computer executable code is trained using a token-level negative log-likelihood loss over all time-steps: $L=-\Sigma_t^T \log p(\alpha_t)$.

11. A method for multimedia data analysis, comprising:
  receiving, by a computing device, a task comprising task description and task meta info, wherein the task description is in text format, and the task meta info comprises source, type and index of the task;
  providing, by the computing device, multimedia context related to the task, wherein the multimedia context comprises context text, context image, and context meta info comprising source, type and index of the context;
  embedding, by the computing device, sequential words of the task description into task description embeddings, performing a first neural network on the task description embeddings to obtain task feature vectors, encoding the task meta info into task embedding vectors, and concatenating the task feature vectors and the task embedding vectors into concatenated task vectors;
  when the context comprises the context text, embedding, by the computing device, sequential words of the context text into context text embeddings, performing a second neural network on the context text embeddings to obtain context feature vectors, encoding the context meta info into context embedding vectors, and concatenating the context feature vectors and the context embedding vectors into concatenated context vectors;
  when the context comprises the context image, performing, by the computing device, a third neural network on the context image to obtain context image embeddings, performing a fourth neural network on the context image embeddings to obtain the context feature vectors, encoding the context meta info into the context embedding vectors, and concatenating the context feature vectors and the context embedding vectors into the concatenated context vectors;
  performing, by the computing device, dual coattention on the task feature vectors, the concatenated task vectors, the context feature vectors and the concatenated context vectors, to obtain attended task vectors and attended context vectors;
  performing, by the computing device, a fifth neural network on the attended task vectors and the attended context vectors to obtain task encoding and context encoding; and
  decoding, by the computing device, the task encoding and the context encoding to obtain an answer to the task.

12. The method of claim 11,
  wherein the step of encoding the task meta info into task embedding vectors comprises: converting the task meta info into task one-hot vectors, and multiplying the task one-hot vectors and task matrices to form the task embedding vectors, wherein the task matrices comprise a source matrix representing sources of the task, a type matrix representing type of the task, and an index matrix representing indices of the task; and
  wherein the step of encoding the context meta info into context embedding vectors comprise: converting the context meta info into context one-hot vectors, and multiplying the context one-hot vectors and the task matrices to form the context embedding vectors.

13. The method of claim 11, wherein each of the first, the second, the fourth and the fifth neural networks is a bi-directional long-short term memory network (BiLSTM), and the third neural network is a convolutional neural network (CNN).

14. The method of claim 13, wherein the step of performing CNN on the context image to obtain context image embeddings comprises:
  dividing the context image into a plurality of regions;
  performing CNN on each of the regions; and
  taking hidden layers of the CNN as the context image embeddings.

15. The method of claim 11, wherein the computer executable code is configured to decode the task encoding and the context encoding to obtain the answer to the task by:
  embedding words of a part of the answer at previous time steps to obtain embedded partial answer;
  applying one directional LSTM on the embedded partial answer to obtain intermediate decoder state;
  combining the intermediate decoder state with the task encoding to obtain distribution of task word vectors in the task encoding;
  combining the intermediate decoder state with the context encoding to obtain distribution of context word vectors in the context encoding;
  combining the intermediate decoder state with the context encoding and context attention to obtain a combination, and apply a fully connected layer on the combination to obtain vocabulary distribution;

generating an output distribution based on distribution of the task word vectors, the distribution of the context word vectors, and the vocabulary distribution; and selecting a next word for the part of the answer from the output distribution.

16. The method of claim 15, wherein the fully connected layer is a feed forward network (FFN).

17. The method of claim 15, wherein the step of generating the output distribution is performed by:

learning a vocabulary pointer switch regulating a probability that the answer is generated from external vocabulary versus the context or the task;

learning a context-task switch regulating a probability that the answer is generated from the context versus the task description; and averaging the distribution of the task word vectors, the distribution of the context word vectors, and the vocabulary distribution using the vocabulary pointer switch and the context-task switch as weights, so as to obtain the output distribution.

18. A non-transitory computer readable medium storing computer executable code, wherein the computer executable code, when executed at a processor of a computing device, is configured to:

receive a task comprising task description and task meta info, wherein the task description is in text format, and the task meta info comprises source, type and index of the task;

provide multimedia context related to the task, wherein the multimedia context comprises context text, context image, and context meta info comprising source, type and index of the context;

embed sequential words of the task description into task description embeddings, perform a first neural network on the task description embeddings to obtain task feature vectors, encode the task meta info into task embedding vectors, and concatenate the task feature vectors and the task embedding vectors into concatenated task vectors;

when the context comprises the context text, embed sequential words of the context text into context text embeddings, perform a second neural network on the context text embeddings to obtain context feature vectors, encode the context meta info into context embedding vectors, and concatenate the context feature vectors and the context embedding vectors into concatenated context vectors;

when the context comprises the context image, perform a third neural network on the context image to obtain context image embeddings, perform a fourth neural network on the context image embeddings to obtain the context feature vectors, encode the context meta info into the context embedding vectors, and concatenate the context feature vectors and the context embedding vectors into the concatenated context vectors;

perform dual coattention on the task feature vectors, the concatenated task vectors, the context feature vectors and the concatenated context vectors, to obtain attended task vectors and attended context vectors;

perform a fifth neural network on the attended task vectors and the attended context vectors to obtain task encoding and context encoding; and decode the task encoding and the context encoding to obtain an answer to the task.

19. The non-transitory computer readable medium of claim 18, wherein the computer executable code is configured to encode the task meta info into task embedding vectors by: converting the task meta info into task one-hot vectors, and multiplying the task one-hot vectors and task matrices to form the task embedding vectors, wherein the task matrices comprise a source matrix representing sources of the task, a type matrix representing type of the task, and an index matrix representing indices of the task;

wherein the computer executable code is configured to encode the context meta info into context embedding vectors by: converting the context meta info into context one-hot vectors, and multiplying the context one-hot vectors and the task matrices to form the context embedding vectors;

wherein each of the first, the second, the fourth and the fifth neural networks is a bi-directional long-short term memory network (BiLSTM), and the third neural network is a convolutional neural network (CNN); and wherein the computer executable code is configured to perform CNN on the context image to obtain context image embeddings by: dividing the context image into a plurality of regions; performing CNN on each of the regions; and taking hidden layers of the CNN as the context image embeddings.

20. The non-transitory computer readable medium of claim 18, wherein the computer executable code is configured to decode the task encoding and the context encoding to obtain the answer to the task by:

embedding words of a part of the answer at previous time steps to obtain embedded partial answer;

applying one directional LSTM on the embedded partial answer to obtain intermediate decoder state;

combining the intermediate decoder state with the task encoding to obtain distribution of task word vectors in the task encoding;

combining the intermediate decoder state with the context encoding to obtain distribution of context word vectors in the context encoding;

combining the intermediate decoder state with the context encoding and context attention to obtain a combination, and apply a fully connected layer on the combination to obtain vocabulary distribution;

generating an output distribution based on distribution of the task word vectors, the distribution of the context word vectors, and the vocabulary distribution; and selecting a next word for the part of the answer from the output distribution.

* * * * *